(12) United States Patent
Lee

(10) Patent No.: US 10,126,939 B2
(45) Date of Patent: Nov. 13, 2018

(54) PORTABLE DEVICE AND METHOD FOR CONTROLLING SCREEN THEREOF

(71) Applicant: Samsung Electronics Co., Ltd., Gyeonggi-do (KR)

(72) Inventor: Hoyoung Lee, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 15/350,475

(22) Filed: Nov. 14, 2016

(65) Prior Publication Data

US 2017/0139585 A1    May 18, 2017

(30) Foreign Application Priority Data

Nov. 18, 2015  (KR) .................. 10-2015-0161775

(51) Int. Cl.
| | | |
|---|---|---|
| *G06F 3/0488* | (2013.01) | |
| *G06F 1/16* | (2006.01) | |
| *G06F 3/041* | (2006.01) | |
| *G06F 3/0484* | (2013.01) | |
| *G06F 3/0485* | (2013.01) | |

(52) U.S. Cl.
CPC ........ *G06F 3/04883* (2013.01); *G06F 1/1613* (2013.01); *G06F 3/0416* (2013.01); *G06F 3/0485* (2013.01); *G06F 3/04845* (2013.01); *G06F 3/04886* (2013.01); *G06F 1/1626* (2013.01); *G06F 2203/04808* (2013.01)

(58) Field of Classification Search
None
See application file for complete search history.

(56) References Cited

U.S. PATENT DOCUMENTS

| | | |
|---|---|---|
| 2010/0107066 A1 | 4/2010 | Hiitola et al. |
| 2011/0126094 A1 | 5/2011 | Horodezky et al. |
| 2013/0311921 A1 | 11/2013 | Fleizach et al. |
| 2014/0068478 A1 | 3/2014 | Won et al. |
| 2014/0201677 A1 | 7/2014 | Jin |
| 2014/0253477 A1 | 9/2014 | Shim et al. |

FOREIGN PATENT DOCUMENTS

| | | |
|---|---|---|
| KR | 10-2012-0032012 A | 4/2012 |
| KR | 10-2012-0096047 A | 8/2012 |
| KR | 10-2015-0049716 A | 5/2015 |
| KR | 10-2015-0053398 A | 5/2015 |
| KR | 10-2015-0121411 A | 10/2015 |

OTHER PUBLICATIONS

International Search Report dated Feb. 28, 2017.
European Search Report dated Aug. 10, 2018.

*Primary Examiner* — Gustavo Polo
(74) *Attorney, Agent, or Firm* — Cha & Reiter, LLC

(57) ABSTRACT

A portable device and a method for controlling a screen thereof, which move a displayed screen corresponding to a movement distance of a touch gesture that is detected from a touch screen, are provided. In an aspect, the portable device and a method for controlling a screen thereof move a displayed screen corresponding to a movement distance of a touch gesture that is detected from a touch screen and stored setting.

16 Claims, 26 Drawing Sheets

PORTABLE DEVICE AND METHOD FOR CONTROLLING SCREEN THEREOF

CLAIM OF PRIORITY

This application claims the benefit of priority under 35 U.S.C. § 119(a) of a Korean patent application filed on Nov. 18, 2015, in the Korean Intellectual Property Office and assigned Serial No. 10-2015-0161775, the entire disclosure of which is hereby incorporated by reference.

BACKGROUND

Field of the Disclosure

One or more embodiments of the present disclosure relates to a portable device and a method for controlling a screen thereof. More particularly, the present disclosure relates to a portable device and a method for controlling a screen thereof, which can move a displayed screen in accordance with a touch gesture that is detected through a touch screen.

Description of the Related Art

Recently, diverse services and functions that are provided from a portable device have been gradually extended, and multitasking by the portable device has also become possible. As the screen size of some portable devices has become larger, the screen resolution has also become higher.

The screen of the portable device was initially manufactured as a flat display, but more recent portable devices have been developed which incorporate a curved display. In addition to the manufacture of a portable device having a screen of which only one side is curved, there has also development of a portable device having a screen with both sides being curved.

In the case where a user, who has hand impairments or short fingers, moves (e.g., scrolls) a screen with his/her finger (e.g., thumb or another finger) of the right hand (or left hand) with which the user is grasping a portable device having a large-sized display, it is not easy for the user to manipulate the large-sized display. In this case, the user having hand impairments or short fingers may need to manipulate the large-sized display with both hands or using a separate tool. Further, similar issues may occur even in the case of a portable device having a curved display.

SUMMARY

In accordance with an aspect of the present disclosure, a portable device includes a touch screen configured to display a first screen; and a control unit configured to control the touch screen, wherein the control unit operates to move the first screen corresponding to a direction of a continuous movement of a first touch that is detected from the first screen, and a movement distance of the first screen is different from a movement distance of the detected first touch in accordance with a stored first gesture setting.

The first gesture setting may be set in accordance with a ratio of a user's average touch gesture length to a maximum touch gesture length, and the control unit may operate to move the first screen corresponding to the continuous movement of the first touch using the first gesture setting.

In accordance with another aspect of the present disclosure, a method for controlling a screen of a portable device includes storing a gesture setting through a touch screen; displaying a first screen on the touch screen; detecting a first touch gesture from the touch screen; and moving the first screen using a length of the detected first touch gesture and the gesture setting, wherein a movement distance of the first screen is different from a movement distance of the detected first touch gesture in accordance with the gesture setting.

In a portable device having a large screen, a portable device that a user who has hand impairments and/or a user who has short fingers can easily manipulate through a touch and a method for controlling the screen thereof may be provided.

In the case where a movement distance of the same touch gesture is detected in a portable device having a large screen, a portable device in which a movement distance of a screen is correspondingly different from the movement distance of the touch gesture and a method for controlling the screen thereof may be provided.

In a portable device having a large edge touch screen, a portable device that a user who has hand impairments and/or a user who has short fingers can easily manipulate through a touch and a method for controlling the screen thereof may be provided.

In the case of grasping a portable device having a large edge touch screen with one hand, a portable device that a user who has hand impairments and/or a user who has short fingers can easily manipulate through a touch and a method for controlling the screen thereof may be provided.

In the case where a movement distance of the same touch gesture is detected in a portable device having a large edge touch screen, a portable device in which a movement distance of a screen is correspondingly different from the movement distance of the touch gesture and a method for controlling the screen thereof may be provided.

Without being limited thereto, according to various embodiments of the present disclosure, in a portable device having a large screen, a portable device that a user who has hand impairments and/or a user who has short fingers can easily manipulate through a touch and a method for controlling the screen thereof may be provided.

BRIEF DESCRIPTION OF THE DRAWINGS

FIG. 4N and FIG. 4O illustrate screen examples displayed by the portable device in response to gestures defined on a gesture setting screen according to an embodiment of the present disclosure;

DETAILED DESCRIPTION

Figure 1A:
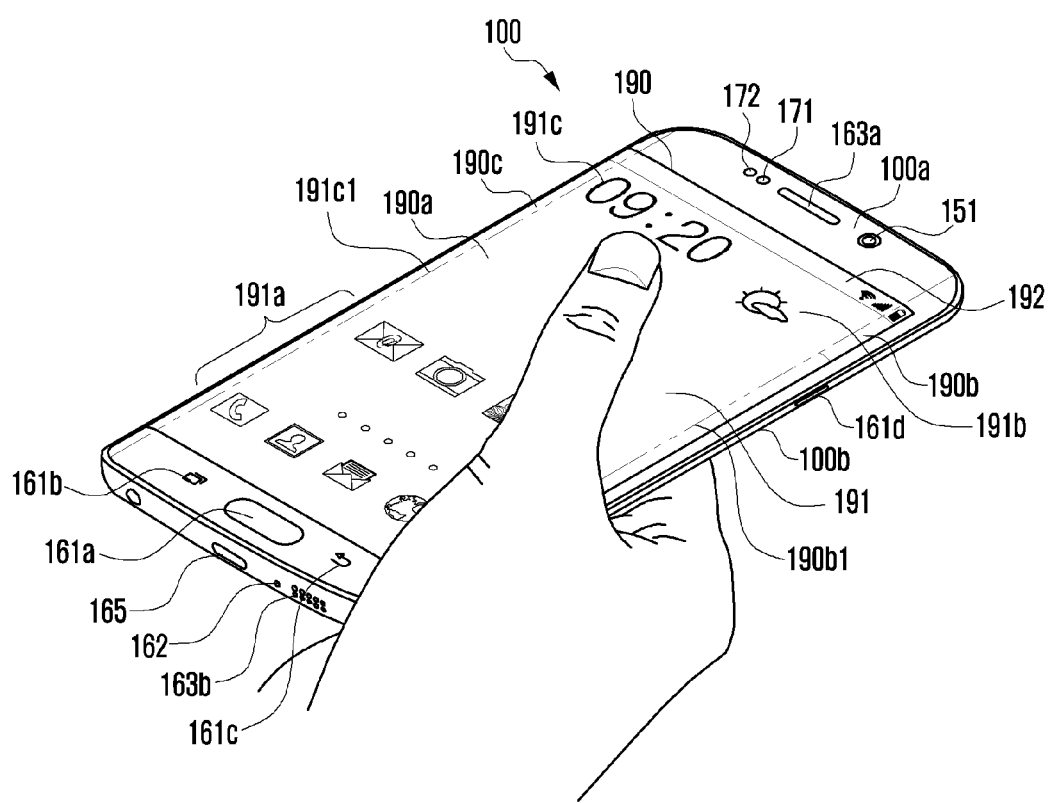
FIG. 1A and FIG. 1B are front perspective views illustrating a portable device according to an embodiment of the present disclosure.

Hereinafter, embodiments of the present disclosure will be described in detail with reference to the contents described in the accompanying drawings. Further, a method for manufacturing and using the present disclosure will be described in detail with reference to the contents described in the accompanying drawings. In the drawings, the same reference numerals or symbols denote components or constituent elements that perform substantially the same functions.

Although the terms including ordinals, such as "first, second, and so forth", are used to describe diverse constituent elements, the above-described constituent elements are not limited by the terms. The terms may be used only to discriminate a constituent element from other constituent elements. For example, in the claims of the present disclosure, a first constituent element may be called a second constituent element. Further, a second constituent element may be called a first constituent element. The term "and/or" includes a combination of a plurality of described items or any one of a plurality of described items.

A touch screen according to an embodiment of the present disclosure may include an edge touch screen that is curved and a flat touch screen that is not curved (i.e. flat). System (OS) for a computer, an embedded OS, or a mobile OS to be used by a user. For example, the application may include a web browser, a photo album application, a word processor, a spread sheet, a contacts application, a calendar application, a memo application, an alarm application, a social media (e.g., Social Network System (SNS) or blog) application, a game marketplace, a chatting application, a map application, a music player, or a video player.

The application according to an embodiment of the present disclosure may mean software that is executed in a portable device or an external device (e.g., another portable device or server) that is connected to the portable device by wire or wirelessly. Further, the application according to an embodiment of the present disclosure may comprise software that is executed by the portable device corresponding to a received user input.

Content according to an embodiment of the present disclosure may be displayed by an executed application. For example, the content may include a video file or an audio file that is reproduced by a video player that is one of applications, a music file that is reproduced by a music player, a photo file that is displayed in a photo gallery, and a web page file that is displayed by a web browser. The content may include a video file, an audio file, a text file, an image file, or a web page that is displayed or executed by the application.

The term "video" according to an embodiment of the present disclosure may be used as the same meaning as a moving image. The content may include a video file, an audio file, a text file, an image file, or a web page that is executed to correspond to a received user input (e.g., touch). Further, the content may include an executed application screen and a user interface that constitutes the application screen. Further, the content may include one piece of content or plural pieces of content.

The term "widget" according to an embodiment of the present disclosure may refer to a mini-application which is one of Graphic User Interfaces (GUIs) that supports an interaction between a user and an application or the OS more smoothly. For example, the widget may be, for example, a weather widget, a calculator widget, or a watch widget.

In the following description of the present disclosure, the terms used are for explaining embodiments of the present disclosure, but do not intend to limit the scope of the present disclosure. A singular expression may include a plural expression unless specially described. It should be understood that the term "includes" or "has" used in the description is to designate the existence of features, figures, steps, operations, constituent elements, components, or combinations thereof, and does not pre-exclude the existence or addition of one or more other features, figures, steps, operations, constituent elements, components or combinations thereof. The same reference numerals in the respective drawings denote members that perform substantially the same function.

Figure 1B:
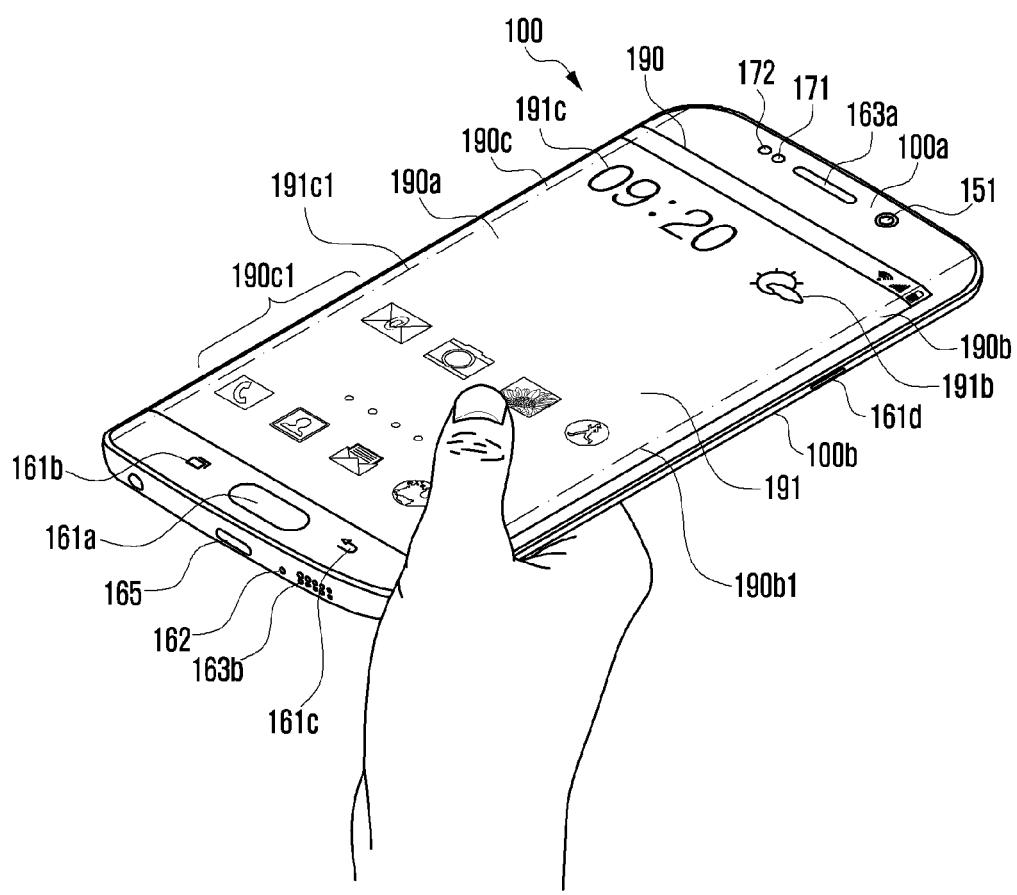

FIGS. 1A and 1B are schematic front perspective views illustrating a portable device according to an embodiment of the present disclosure.

Referring now to FIGS. 1A and 1B, a user grasps a portable device 100 with one hand. The size of a hand and/or the length of a finger may differ in accordance with the user. For example, a user shown in FIG. 1A has a large hand and long fingers as compared with a user shown in FIG. 1B. The user in FIG. 1A can manipulate (e.g., touch) an upper end of the screen of the portable device 100 at any time. The user in FIG. 1B may have to re-grasp/reposition the portable device in order to manipulate (e.g., touch) the upper end of the screen of the portable device 100.

An edge touch screen 190 is located in a center region of a front surface 100a of the portable device 100. The edge touch screen 190 may indicate a flexible display panel (not illustrated) that is bendable. The edge touch screen 190 may include a curved touch panel (not illustrated) that corresponds to the curved display panel (not illustrated). The edge touch screen 190 will be described in more detail herein after. Further, although FIGS. 1A and 1B illustrate the edge touch screen, the present disclosure is not limited the depictions in these figures. For example, a touch screen may be located in the center region of the front surface 100a of the portable device 100. The touch screen may indicate a flat display panel (not illustrated). The touch screen may include a flat touch panel (not illustrated) that corresponds to the flat display panel (not illustrated).

The edge touch screen 190 may be formed through a thin flexible printed circuit board (not illustrated), and thus can be flexed or bended. The edge touch screen 190 may include a main touch screen 190a and edge touch screens 190b and 190c. In the edge touch screen 190, the main touch screen 190a and the edge touch screens 190b and 190c on both sides of the main touch screen may be housed in a body.

The edge touch screen 190 may include the main touch screen 190a, and may further include the left edge touch screen 190b and the right edge touch screen 190c.

FIGS. 1A and 1B exemplify an edge touch screen 190 on which a home screen 191 is displayed. A plurality of home screens that are different from one another may be displayed on the edge touch screen 190 of the portable device 100. Shortcut icons 191a, a weather widget 191b, and a clock widget 191c, which correspond to applications that can be selected by a touch (e.g., hovering), may be displayed in various arrangements on the home screen 191.

At an upper end of the home screen 191, a status bar 192 that indicates the various statuses of the portable device 100, such as battery charging status, received signal strength, and current time, may be displayed. Further, the home screen 191 of the portable device 100 may be located at a lower end of the status bar 192, or only the home screen 191 may be displayed in a state where the status bar 192 is not displayed.

On an upper portion of the front surface 100a of the portable device 100, a first camera 151, a speaker 163a, a proximity sensor 171, and an illumination sensor 172 may be located. On the rear surface (not illustrated) of the portable terminal 100, a second camera 152 (see FIG. 2) and a flash 153 (see FIG. 2) may be located.

On a lower portion of the front surface 100a of the portable device 100, a home button 161a, a recent app button 161b, and a back button 161c may be located. The buttons 161a to 161c may be implemented by not only physical buttons but also by touch (virtually displayed) buttons. Further, the buttons 161a to 161c may be displayed together with texts or other icons in the touch screen 190.

On a side surface of the portable device 100, a power/lock button 161d and a volume button (not illustrated) may be located. The side surfaces of the portable device 100 may connect the front surface 100a and the rear surface (not illustrated) of the portable device 100 to each other. The side surfaces of the portable device 100 may include a left side surface, a right side surface, an upper end, and a lower end.

At the lower end of the portable device 100, a microphone 162, a connector 165 and/or a speaker 163b may be located. At the lower end of the portable device 100, an insertion hole (not illustrated), into which an input pen 167 (see the input/output unit 160 of FIG. 2) having a button (not illustrated) can be inserted, may be located. The input pen 167 (see FIG. 2) may be inserted through the insertion hole (not illustrated) to be kept within the portable device 100, and may be drawn out of the portable device 100.

Figure 2:
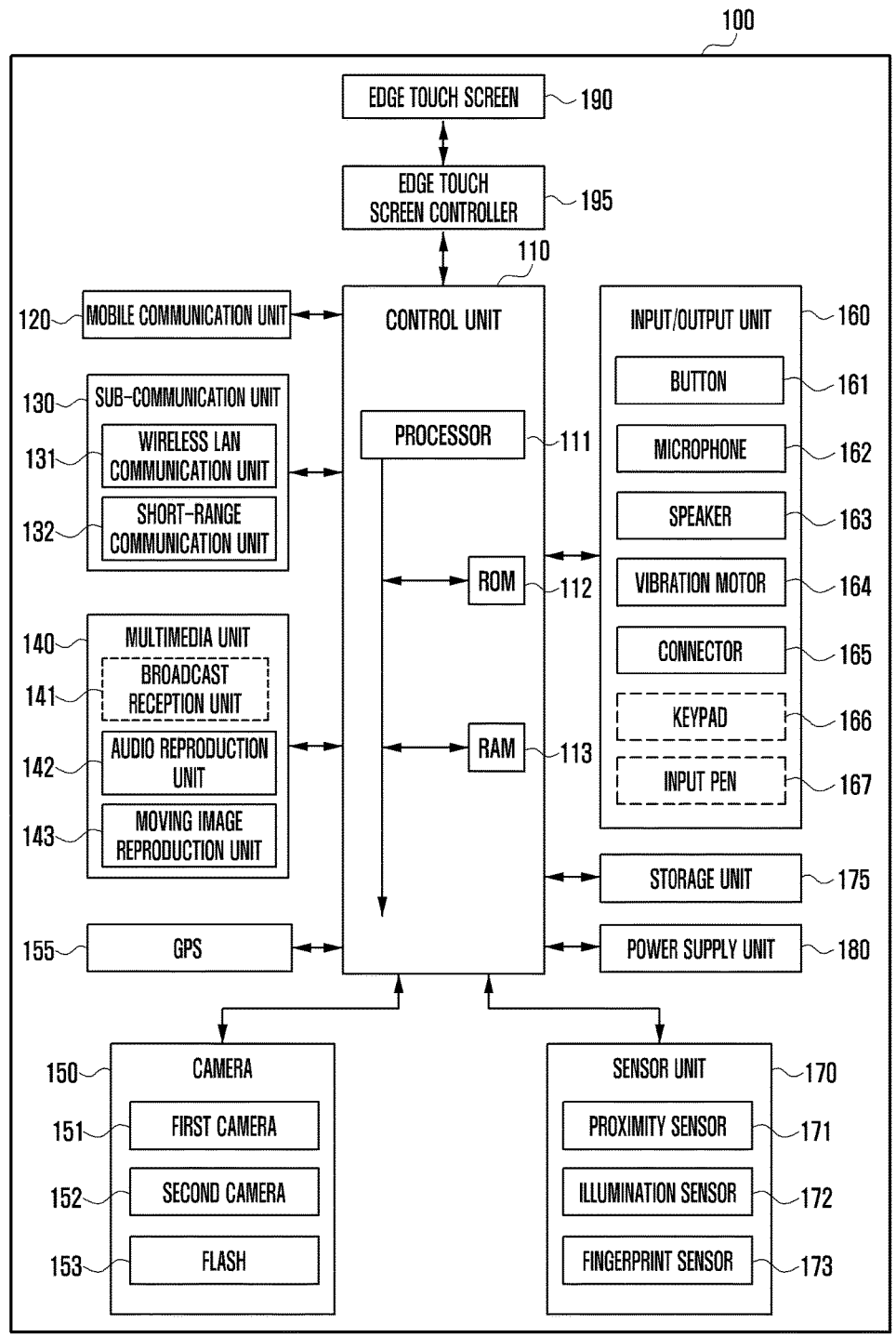
FIG. 2 is a schematic block diagram illustrating a portable device according to an embodiment of the present disclosure.

FIG. 2 is a schematic block diagram illustrating a portable device according to an embodiment of the present disclosure.

Referring now to FIG. 2, a portable device 100 may be connected to another device (e.g., wearable device or server) by wire or wirelessly using a mobile communication unit 120, a sub-communication unit 130, and a connector 165. For example, the portable device 100 may include any of a portable phone, a smart phone, a tablet device, an MP3 player, a moving image player, an electronic board, a monitor, an electronic device having a display (e.g., refrigerator, washing machine, or air conditioner), or a display device (not illustrated), just to name a few non-limiting types of devices.

The display device (not illustrated) may be implemented, for example, by an analog TV, a digital TV, a 3D TV, a smart TV, an LED TV, an OLED TV, a plasma TV, a curved TV having a fixed curvature screen, a flexible TV having a fixed curvature screen, a bended TV having a fixed curvature screen and/or a curvature variable TV having a screen of which the curvature can be changed by a received user input. However, it will be understood by those of ordinary skill in the art to which the present disclosure pertains that the display device is not limited thereto.

The portable device 100 may include a touch screen, and may transmit/receive data (or content) to/from external device/network through the communication unit 120 or 130. The portable device 100 may include an input pen 167 and a touch screen, and may transmit/receive data (or content) externally through the communication unit 120 or 130.

The portable device 100 may transmit/receive data (or content) to/from an external device/network corresponding to an interaction (e.g., touch or touch gesture) that is input through the touch screen. Further, the portable device 100 may include a display unit (e.g., display panel (not illustrated) without a touch panel), and may transmit/receive data (or content) to/from an external device/network through the communication unit 120 or 130.

The portable device 100 may include a control unit (i.e. controller) 110, a mobile communication unit 120, a sub-communication unit 130, a multimedia unit 140, a camera 150, a Global Positioning System (GPS) 155, an input/output unit 160, a sensor unit 170, a storage unit 175, and a power supply unit 180. Further, the portable device 100 may include an edge touch screen 190 and an edge touch screen controller 195.

The control unit 110 may include a processor 111 having hardware circuitry configured for operation. The control unit 110 may further include a ROM 112 which stores therein a control program for controlling the portable device 100 and a RAM 113 which stores signals or data that are input externally to the portable device 100, or which is used as a storage region for various jobs that are performed by the portable device 100.

The control unit 110 or processor 111 may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. In addition, an artisan understands and appreciates that a "processor" or "microprocessor" may be hardware in the claimed disclosure.

The control unit 110 may control the overall operation of the portable device 100 and a signal flow between internal constituent elements 110 to 195 of the portable device 100, and may perform a data processing function. The control unit 110 may control the power supplied to the internal constituent elements 110 to 195 via the power supply unit 180.

The processor 111 may include a Graphics Processing Unit (GPU) (not illustrated) for processing graphics. Further, the processor 111 may include a sensor processor (e.g. sensor hub, not illustrated) for controlling the sensor.

The processor 111 may be implemented in the form of a System on Chip (SoC) that includes a core (not illustrated) and a GPU (not illustrated). The processor 111 may include a single core, dual cores, triple cores, quad cores, and their multiple cores. Further, the processor 111, the ROM 112, and the RAM 113 may be connected to one another through a bus.

The control unit 110 may be configured to control the mobile communication unit 120, the sub-communication unit 130, the multimedia unit 140, the camera 150, the GPS 155, the input/output unit 160, the sensor unit 170, a storage unit 175, the power supply unit 180, the edge touch screen 190, and the edge touch screen controller 195.

The control unit 110 may control the touch screen for displaying a first screen, operate to move the display of the first screen corresponding to a direction of a continuous movement of a first touch that is detected from the first screen, and operate to make a movement distance of the first screen differ from a movement distance of the detected first touch in accordance with a stored first gesture setting.

The first gesture setting may be set, for example, in accordance with a ratio of a user's average touch gesture length to a maximum touch gesture length, and the control unit 110 may operate to move the first screen corresponding to the continuous movement of the first touch using the first gesture setting.

The control unit 110 may operate to make the movement distance of the continuous movement of the detected first touch larger than the movement distance of the first screen.

The control unit 110 may detect the continuous movement of the first touch, starting from an initial location of the first touch and arriving at a last location thereof.

The control unit 110 may detect the continuous movement of the first touch from the edge touch screen, and may operate to move the first screen corresponding to the direction of the continuous movement of the first touch that is detected from the edge touch screen in accordance with a stored second gesture setting.

The second gesture setting may be set, for example, in accordance with the ratio of the user's average touch gesture length to the maximum touch gesture length on the edge touch screen, and the control unit 110 may operate to move the first screen corresponding to the continuous movement of the first touch using the second gesture setting.

The control unit 110 may operate to make the movement distance of the continuous movement of the detected first touch larger than the movement distance of the first screen.

The control unit 110 may operate to make the movement distance of the first screen corresponding to the first gesture setting and the continuous movement of the first touch differ from the movement distance of the first screen corresponding to the second gesture setting and the continuous movement of the first touch.

In an embodiment of the present disclosure, the term "control unit" may include the processor 111, the ROM 112, and the RAM 113.

The mobile communication unit 120 may be connected to another device (e.g., another portable device, wearable device, or a server) through a mobile communication network using one or two or more antennas under the control of the control unit 110. The mobile communication unit 120 may receive data (or content) from another device under the control of the control unit 110. The received data (or content) may be stored in the storage unit 175 under the control of the control unit 110.

With continued reference to FIG. 2, the sub-communication unit 130 may be connected to another device (e.g., another portable device, wearable device, or server) through a wireless LAN communication unit 131 and/or a short-range communication unit 132 under the control of the control unit 110. The sub-communication unit 130 may receive data (or content) from another device under the control of the control unit 110. The received data (or content) may be stored in the storage unit 175 under the control of the control unit 110.

The wireless LAN communication unit 131 may be wirelessly connected to an Access Point (AP) in a place where the AP is installed under the control of the control unit 110. For example, the wireless LAN communication unit 131 may include Wi-Fi. The wireless LAN communication unit 131 may support the wireless LAN standard (IEEE 802.11x) of Institute of Electrical and Electronics Engineers (IEEE).

The short-range communication unit 132 may perform short-range communication between the portable device 100 and an external device wirelessly without the AP under the control of the control unit 110. The short-range communication may include one or more of Bluetooth, Bluetooth low energy, Infrared Data Association (IrDA), and Near Field Communication (NFC).

The portable device 100 may include one of the mobile communication unit 120, the wireless LAN communication unit 131, and the short-range communication unit 132, or a combination of the mobile communication unit 120, the wireless LAN communication unit 131, and the short-range communication unit 132 in accordance with the function and/or performance of the portable device 100. The portable device 100 may be connected to various external accessories (e.g., wireless speaker and wireless headset) using one of the mobile communication unit 120 and the sub-communication unit 130.

In an embodiment of the present disclosure, the term "communication unit" may include the mobile communication unit 120 and/or the sub-communication unit 130. An artisan should understand and appreciate that a communication unit includes hardware such as a transmitter, receiver, transceiver, and may include or be switchably coupled to an antenna, antenna array, etc.

The multimedia unit 140 may reproduce a broadcast, audio and/or moving image under the control of the control unit 110. The multimedia unit 140 may include a broadcast reception unit 141, an audio reproduction unit 142 and/or a moving image reproduction unit 143.

The broadcast reception unit 141 may receive a broadcasting signal (e.g., TV broadcasting signal, radio broadcasting signal, or data broadcasting signal) that is output from an external broadcasting station and additional broadcast information (e.g., Electronic Program Guide (EPG) or Electronic Service Guide (ESG)) through an antenna (not illustrated) under the control of the control unit 110. Further, the control unit 110 may operate to reproduce the received broadcasting signal and additional broadcast information through the edge touch screen, a video codec (not illustrated), and an audio codec (not illustrated).

The audio reproduction unit 142 may reproduce an audio source (e.g., audio file having file extension mp3, wma, ogg, or way) that is pre-stored in the storage unit 175 of the portable device 100 or received from an outside using the audio codec under the control of the control unit 110.

In an embodiment of the present disclosure, the audio reproduction unit 142 may reproduce auditory feedback that corresponds to a change to another screen in accordance with a touch gesture that is input to the edge touch screen 190. For example, the audio reproduction unit 142 may reproduce auditory feedback (e.g., output of an audio source that is stored in the storage unit) that corresponds to the movement of a screen, in accordance with a touch gesture that is input to the edge touch screen 190, using the audio codec under the control of the control unit 110.

In an embodiment of the present disclosure, the audio reproduction unit 142 may reproduce sound, such as auditory feedback (e.g., output of an audio source that is stored in the storage unit) that corresponds to a touch that is detected from the edge touch screen 190 or a continuous movement of the touch through the audio codec under the control of the control unit 110.

The moving image reproduction unit 143 may reproduce a digital moving image source (e.g., video file having file extension mpeg, mpg, mp4, avi, mov, or mkv) that is pre-stored in the storage unit 175 of the portable device 100, or received from an outside, using the video codec under the control of the control unit 110.

A multimedia application that can be installed in the portable device 100 may reproduce an audio source or a moving image source using the audio codec and/or the video codec. Further, the multimedia application that can be installed in the portable device 100 may reproduce the moving image source using a hardware codec (not illustrated) and/or a software codec (not illustrated).

Still referring to FIG. 2, in an embodiment of the present disclosure, the moving image reproduction unit 143 may reproduce visual feedback that corresponds to the movement of a screen in accordance with a touch gesture that is input to the edge touch screen 190. For example, the moving image reproduction unit 143 may reproduce visual feedback (e.g., output of a moving image source that is stored in the storage unit) that corresponds to the movement of the screen in accordance with the touch gesture that is input to the edge touch screen 190 through the video codec under the control of the control unit 110.

It will be understood by those of ordinary skill in the art to which the present disclosure pertains that various kinds of video codecs and audio codecs which can reproduce an audio/video file having various file extensions have been produced and are commercially available.

The multimedia unit 140 may include only the audio reproduction unit 142 and the moving image reproduction unit 143 except for the broadcast reception unit 141 corresponding to the performance or structure of the portable device 100. Further, the control unit 110 may be implemented to include one or more of the audio reproduction unit 142 and the moving image reproduction unit 143 of the multimedia unit 140.

In an embodiment of the present disclosure, the term "audio codec" may include one, two, or more than two audio codecs. In an embodiment of the present disclosure, the term "video codec" may include one, two, or more than two more video codecs.

The camera 150 may capture a still image or a moving image under the control of the control unit 110. The camera 150 may include one or both of a first camera 151 on the front surface 100a of the portable device 100, and a second camera 152 on the rear surface. Further, the first camera 151 and/or the second camera 152 may include an auxiliary light source (e.g., flash 153) which provides a quantity of light that is required for image capturing.

The camera 150 may be implemented in a form that includes the first camera 151 arranged on the front surface of the portable device 100 and an additional camera (i.e., third camera (not illustrated)) that is arranged adjacent the first camera 151 (e.g., in the form in which the first camera and the third camera are implemented as one unit). For example, a gap between the third camera (not illustrated) and the first camera 151 may be set to be, for example, larger than 2 mm and smaller than 80 mm. If the third camera (not illustrated) is further included, the control unit 110 may capture a 3D still image or a 3D moving image using the first camera 151 and the third camera (not illustrated).

The camera 150 may be implemented in the form that further includes the second camera 152 arranged on the rear surface and an additional camera (i.e., fourth camera (not illustrated)) that is adjacent the second camera 152 (e.g., in the form in which the first camera and the third camera are implemented as one unit). For example, a gap between the fourth camera (not illustrated) and the second camera 152 may be set to be, for example, larger than 2 mm and smaller than 80 mm. If the fourth camera (not illustrated) is further included, the control unit 110 may capture a 3D still image or a 3D moving image using the second camera 152 and the fourth camera (not illustrated).

The cameras 150, 152 may perform wide-angle, telescopic, and close-up photography using additional lenses (not illustrated) that are detachably attached to a separate adaptor (not illustrated).

With continued reference to FIG. 2, the GPS 155 may periodically receive signals (e.g., GPS satellite orbit information, satellite time information, and navigation message) from a plurality of GPS satellites (not illustrated) existing on the earth orbit. The portable device 100 may calculate locations of the plurality of GPS satellites (not illustrated) and the portable device 100 using the received signals, and may calculate a distance using a transmission/reception time difference. The location of the portable device 100, time, or movement speed may be calculated through triangular measurement. An additional GPS satellite may be necessary for orbit correction or time correction.

In the interior of a room, the portable device 100 may detect the location or the movement speed of the portable device 100 using a wireless AP (not illustrated). Further, the portable device 100 may detect the location or the movement speed of the portable device 100 that is located in the room using a wireless beacon (not illustrated). In addition, it will be understood by those of ordinary skill in the art to which the present disclosure pertains that the indoor location of the portable device 100 can be detected in various ways.

The input/output unit 160 may include a structure of at least one of: one, two or more than two buttons 161, a microphone 162, a speaker 163, a vibration motor 164, a connector 165, a keypad 166, and an input pen 167.

Referring now to FIGS. 1A and 1B, the buttons 161 may include a home button 161a, a recent app button 161b, and a back button 161c that are provided on a lower portion of the front surface 100a of the portable device 100. The buttons 161 may include a power/lock button 161d and one or plural volume buttons (not illustrated) that are provided on a side surface of the portable device 100.

The buttons 161 of the portable device 100 may include, for example only the home button 161a, the power/lock button 161d, and the volume button (not illustrated). The buttons 161 may be implemented not only by physical buttons but by virtually displayed buttons that are activated by touch or near-touch. Further, the buttons 161 of the portable device 100 may be displayed on the touch screen 190 in the form of texts, images, or icons. The shape, location, function, and title of the buttons 161 as illustrated in FIGS. 1A and 1B are exemplary for explanation, but are not limited thereto. It will be understood by those of ordinary skill in the art to which the present disclosure pertains that the buttons 161 may be changed, modified, or corrected.

The microphone 162 may receive an input of voice or sound from an external source and may generate an electrical signal under the control of the control unit 110. The electrical signal that is generated from the microphone 161*a* may be converted by the audio codec under the control of the control unit 110, and may be stored in the storage unit 175, or may be output through the speaker 163. Referring to FIGS. 1A and 1B, one, two, or more than two microphones 162 may be located on the front surface 100*a*, the side surface and/or the rear surface of the portable device 100. Further, one, two or more than two microphones may be located only on the side surface of the portable device 100.

The speaker 163 may output sound that corresponds to various signals (e.g., wireless signal, broadcasting signal, audio source, moving image file, or photographing) that are decoded by the audio codec under the control of the control unit 110.

Referring again to FIGS. 1A and 1B, one or a plurality of speakers 163 may be located on the front surface 100*a*, the side surface and/or the rear surface of the portable device 100. One or a plurality of speakers may be located on the front surface 100*a* of the portable device 100. Further, one speaker may be located on the front surface and another speaker located on the rear surface of the portable device 100. One speaker 163*a* may be located on the front surface 100*a* of the portable device 100, and a plurality of speakers (not illustrated) may be located on the rear surface of the portable device 100.

One or more speakers (not illustrated) may be located on the side surfaces of the portable device 100. A portable device 100 having the side surfaces on which additional speakers (not illustrated) are located may provide a user with sound effects that are distinguished from those of another portable device (not illustrated) having the front surface 100*a* and the rear surface on which speakers are located.

In an embodiment of the present disclosure, the speaker 163 may output auditory feedback that corresponds to the screen movement in accordance with the touch gesture that is input onto the edge touch screen 190.

The vibration motor 164 may convert an electrical signal into mechanical vibration under the control of the control unit 110. The vibration motor 164 may include a linear vibration motor, a bar type vibration motor, a coin type vibration motor, or a piezoelectric element vibration motor, just to name to non-limiting possibilities.

One or two or more vibration motors 164 may be located on the portable device 100. Further, the vibration motor 164 may vibrate the whole of the portable device 100, or may locally vibrate only one portion of the portable device 100.

In an embodiment of the present disclosure, the vibration motor 164 may output a tactile feedback that corresponds to the screen movement in accordance with the touch gesture that is input onto the edge touch screen 190.

The connector 165 may provide an interface for connecting the portable device 100 to an external device (not illustrated) or a power source (not illustrated). The connector 165 may be located at one of the upper end, the lower end, or the side surface of the portable device 100.

The portable device 100 may transmit stored data (or content) externally or may receive data (or content) from an external source through a wired cable that is connected to the connector 165 under the control of the control unit 110. The portable device 100 may receive an input of a power from a power source (not illustrated) or may charge a battery (not illustrated) through a wired cable that is connected to the connector 165 under the control of the control unit 110. Further, the portable device 100 may be connected to an accessory (e.g., speaker (not illustrated) or a keyboard dock (not illustrated)) through the connector 165.

The keypad 166 may receive a key input for controlling the portable device 100. The keypad 166 may include a physical keypad (not illustrated) that is formed on the front surface of the portable device 100, a virtual keypad (not illustrated) that is displayed on the edge touch screen 190, or a physical keypad (not illustrated) that is connectable by wire or wirelessly.

By a user, the input pen 167 may touch (or select) an object (e.g., menu, text, image, video, figure, icon, or shortcut icon) that is displayed (or constituted) on the edge touch screen 190 of the portable device 100 or a screen (e.g., memo screen, notepad screen, or a calendar screen) that is displayed on a writing/drawing application.

The input pen 167 may be used for contact/near-contact with a capacitive screen, or used for contact with a resistive, or Electromagnetic Resonance (EMR) type touch screen (including an edge touch screen) or may input characters using the virtual keypad being displayed. The input pen 167 may include a stylus pen or a haptic pen (not illustrated) in which a built-in vibration element (e.g., actuator or vibration motor) vibrates. Further, the input pen 167 may operate (e.g., vibrate) the vibration element corresponding to control information that is received from the portable device 100, or according to sensing information that is detected by a sensor (e.g., acceleration sensor (not illustrated)) built in the input pen 167.

While the portable device may include the input pen 167, while discussed above as being a stylus or haptic pen, a user's finger (e.g., including a thumb) may also be used to provide input. For example, in an application that is displayed on a capacitive touch screen (including a capacitive edge touch screen) or a resistive touch screen (including a resistive edge touch screen), a writing or drawing may be input by the user's finger.

The sensor unit 170 may detect the status of the portable device 100 and/or the surrounding status of the portable device 100. The sensor unit 170 may include one or a plurality of sensors. For example, the sensor unit 170 may include a proximity sensor 171 for detecting whether a user approaches the portable device 100, an illumination sensor 172 for detecting the quantity of light around the portable device 100, or a fingerprint sensor 173 for detecting user's fingerprint.

The sensor unit 170 may include an acceleration sensor (not illustrated) for detecting acceleration on three axes (e.g., x, y, and z axes) that is applied to the portable device 100, a gravity sensor for detecting an active direction of gravity, or an altimeter for detecting the altitude through measurement of atmospheric pressure.

The sensor unit 170 may measure motion acceleration and gravity acceleration of the portable device 100. If the portable device 170 does not move, the sensor unit 170 can measure only the gravity acceleration. Further, the sensor unit 170 may further include a heartbit sensor (not illustrated) for detecting user's heartbit.

At least one sensor that is included in the sensor unit 170 may detect the status of the portable device 100, generate an electrical signal that corresponds to the detection, and transmit the generated electrical signal to the control unit 110. It will be understood by those of ordinary skill in the art to which the present disclosure pertains that sensors included in the sensor unit 170 may be added, changed, or deleted in accordance with the performance of the portable device 100.

The storage unit 175. which comprises a non-transitory storage medium, may store signals or data that are input/output corresponding to operations of the mobile communication unit 120, the sub-communication unit 130, the multimedia unit 140, the camera 150, the GPS 155, the input/output unit 160, the sensor unit 170, and the touch screen 190. The storage unit 175 may store a control program for controlling the portable device 100 or the control unit 110, a Graphic User Interface (GUI) related to applications that are provided from manufacturers or downloaded from an outside, images for providing the GUI, user information, documents, databases, or related data.

In an embodiment of the present disclosure, the storage unit 175 stores portable device information including resolution information and size information of the edge touch screen 190, wearable device information, or server information. The storage unit 175 may store size information of a main touch screen of the edge touch screen 190, size information of the first edge touch screen, and size information of the second edge touch screen. The storage unit 175 may store single curvature information or multi-curvature information of the edge touch screen 190.

In an embodiment of the present disclosure, the term "storage unit" includes the storage unit 175, the ROM 112 and the RAM 113 in the control unit 110, or a memory card (not illustrated) (e.g., micro SD card or memory stick) that is mounted on the portable device 100. The storage unit may include a nonvolatile memory, a volatile memory, a Hard Disk Drive (HDD), or a Solid State Drive (SSD).

The power supply unit 180 may supply power to constituent elements 110 to 195 that are located in the interior of the portable device 100 under the control of the control unit 110. The power supply unit 180 may supply a power that is input from an external power source (not illustrated) to the respective constituent elements of the portable device 100 through a wired cable (not illustrated) connected to the connector 165 under the control of the control unit 110.

The power supply unit 180 may charge one, two, or more than two batteries (not illustrated) through supplying power to the batteries under the control of the control unit 110. The one, two, or more than two batteries (not illustrated) may be located between the touch screen 190 that is located on the front surface 100a and the rear surface (not illustrated).

The power supply unit 180 may perform wireless charging (e.g., magnetic resonance type, electromagnetic wave type, or self-induction type) of the batteries (not illustrated) using a coil (not illustrated) under the control of the control unit 110.

The edge touch screen 190 may include an edge touch panel (not illustrated) for receiving a touch input and an edge display panel (not illustrated) for displaying a screen. The edge touch screen 190 may provide a user with a Graphical User Interface (GUI) that corresponds to various services (e.g., voice call, video call, data transmission, broadcast reception, photographing, moving image viewing, and application execution).

The edge touch screen 190 may transmit an analog signal that corresponds to a single touch or a multi-touch input via the home screen 191 or the GUI to an edge touch screen controller 195. The touch screen 190 may receive an input of a single touch or a multi-touch through a user's body (e.g., finger including a thumb) or an input pen 167.

The edge touch screen 190 may be an all-in-one touch screen having curved side surfaces. The edge touch screen 190 may include a main display region 190a and edge display regions 190b and 190c. The main display region 190a may be flat or may have a curvature (e.g., approximating a plane) that is smaller than the curvature of the edge display regions 190a and 190c.

In an embodiment of the present disclosure, the main touch screen may include a touch screen that corresponds to the main display region 190a. Further, the edge touch screen may include a touch screen that corresponds to the edge display regions 190b and 190c. The main touch screen region may include a touch screen region that corresponds to the main display region 190a. Further, the edge touch screen area may include a touch screen region that corresponds to the respective edge display regions 190b and 190c.

The first edge touch screen may comprise a touch screen that corresponds to one of the edge display regions 190b and 190c. The second edge touch screen may comprise a touch screen that corresponds to an edge display region that is different from the first edge touch screen region between the edge display regions 190b and 190c. For example, in the case where the first edge touch screen is a touch screen that corresponds to the edge display region 190b, the second edge touch screen may be a touch screen that corresponds to the edge display region 190c. In contrast, in the case where the first edge touch screen is a touch screen that corresponds to the edge display region 190c, the second edge touch screen may be a touch screen that corresponds to the edge display region 190b.

The main display region 190a may be discriminated from the edge display regions 190b and 190c based on virtual lines 190b1 and 190c1 shown in FIGS. 1A and 1B. The virtual lines 190b1 and 190c1 may be lines on which the curvature of the main display region 190a starts to change. The virtual lines 190b1 and 190c1 may be defined as lines on which the curvature of the main display region 190a is changed to the curvature of the edge display regions 190b and 190c. The virtual lines 190b1 and 190c1 may be defined as lines on which the curvature of the main display region 190a is changed to one of the single curvature and the first curvature of the multi-curvature of the edge display regions 190b and 190c.

The curvature of the edge display regions 190b and 190c may be equal to or higher than 13 R and equal to or lower than 5 R. The cross section (not illustrated) of both sides of the portable device that includes the edge display regions 190b and 190c having the single curvature may include a semicircle or an ellipse.

In an embodiment of the present disclosure, the curvature value is exemplary, and disclosure and breadth of the appended claims are not limited thereto. It will be understood by those of ordinary skill in the art to which the present disclosure pertains that the signal curvature value and/or the multi-curvature value may be different than the examples described herein.

The edge display panel (not illustrated) may include a plurality of pixels, and may display an image through the pixels. For example, the edge display panel (not illustrated) may include a Liquid Crystal Display (LCD), Light-Emitting Diodes (LED), or organic LED. The edge display panel (not illustrated) may display various kinds of operation statuses of the portable device 100, and various images and a plurality of objects in accordance with application or service execution.

In an embodiment of the present disclosure, the touch is not limited to a contact of a user's body or an input pen 167, but may include a non-contact (i.e. near-contact). For example, the non-contact may include hovering in which a gap between the edge touch screen 190 and the user's body or the input pen 167 is equal to or smaller than about 50 mm. It will be understood by those of ordinary skill in the art to which the present disclosure pertains that a non-contact gap that can be detected from the edge touch screen 190 may be changed in value in accordance with the performance or the structure of the portable device 100.

The edge touch screen 190 may be implemented, for example, as a resistive type, a capacitive type, an infrared type, or an acoustic wave type.

The edge touch screen 190 may include an Electromagnetic Resonance (EMR). The EMR type edge touch screen further includes a separate EMR type edge touch panel (not illustrated) for receiving an input of an input pen (not illustrated) having a resonance circuit that resonates with an EMR type loop coil.

The edge touch screen 190 according to an embodiment of the present disclosure may output a visual feedback that corresponds to a change to another screen in correspondence with a touch gesture that is input onto the edge touch screen 190. The edge touch screen 190 may display a visual feedback that corresponds to content that is changed to correspond to the change to another screen corresponding to the touch gesture input to the edge touch screen 190.

In an embodiment of the present disclosure, the display unit may include the edge touch screen 190 or a touch screen (not illustrated).

Referring again to FIG. 2, the edge touch screen controller 195 may convert an analog signal that corresponds to a single touch or multi-touch that is received from the edge touch screen 190 into a digital signal to transmit the converted digital signal to the control unit 110. The control unit 110 may calculate X coordinates and Y coordinates, which correspond to the touch location of the touch that is input through the edge touch screen 190, using the digital signal that is received from the edge touch screen controller 195.

The control unit 110 may control the edge touch screen 190 using the digital signal that is received from the edge touch screen controller 195. For example, the control unit 110 may display a shortcut icon that is displayed on the edge touch screen 190 corresponding to an input touch so that the shortcut icon is distinguishable from other shortcut icons, or may display an application screen on the edge touch screen 190 through execution of an application (e.g., phone call) that corresponds to the selected shortcut icon.

The edge touch screen controller 195 may be implemented by only one edge touch screen controller or by a plurality of edge touch screen controllers. The edge touch screen controller 195 may be included in the control unit 110 to correspond to the performance or the structure of the portable device 100.

The edge touch screen controller 195 may convert an analog signal that corresponds to a touch that is received from the EMR type edge touch screen into a digital signal, separately from an analog signal that corresponds to the single touch or multi-touch that is received from the edge touch screen 190, and may transmit the converted digital signal to the controller 110. The control unit 110 may calculate X coordinates and Y coordinates that correspond to the touch location from the EMR type edge touch screen using the digital signal that is received from the edge touch screen controller 195. Further, in the case of the EMR type edge touch screen, an EMR type edge touch screen controller (not illustrated) may be used.

Although the portable device 100 illustrated in FIGS. 1A to 2 includes only one edge touch screen, it may be provided with a plurality of edge touch screens. Respective edge touch screens may be located on respective housings (not illustrated), and the respective housings (not illustrated) may be connected to each other by one or a plurality of hinges (not illustrated).

A plurality of edge touch screens that are arranged up and down or left and right may be located on the front surface of one housing (not illustrated). The plurality of edge touch screens may be implemented by one edge display panel, or by a plurality of edge touch panels. The plurality of edge touch screens may be implemented by one edge touch panel that corresponds to the plurality of edge display panels. Further, the plurality of edge touch screens may be implemented by the plurality of edge touch panels that correspond to the plurality of edge display panels.

Although the portable device 100 illustrated in FIGS. 1A to 2 includes only the edge touch screens 190a, 190b and 190c, it is exemplary, and is not limited thereto. It will be understood by those of ordinary skill in the art to which the present disclosure pertains that the portable device 100 may be implemented by a flat touch screen that is not curved, other than the edge touch screen.

It will be understood by those of ordinary skill in the art to which the present disclosure pertains that at least one of the constituent elements of the portable device 100 as illustrated in FIGS. 1A to 2 may be added, deleted, or changed to correspond to the performance of the portable device 100.

Figure 3A:
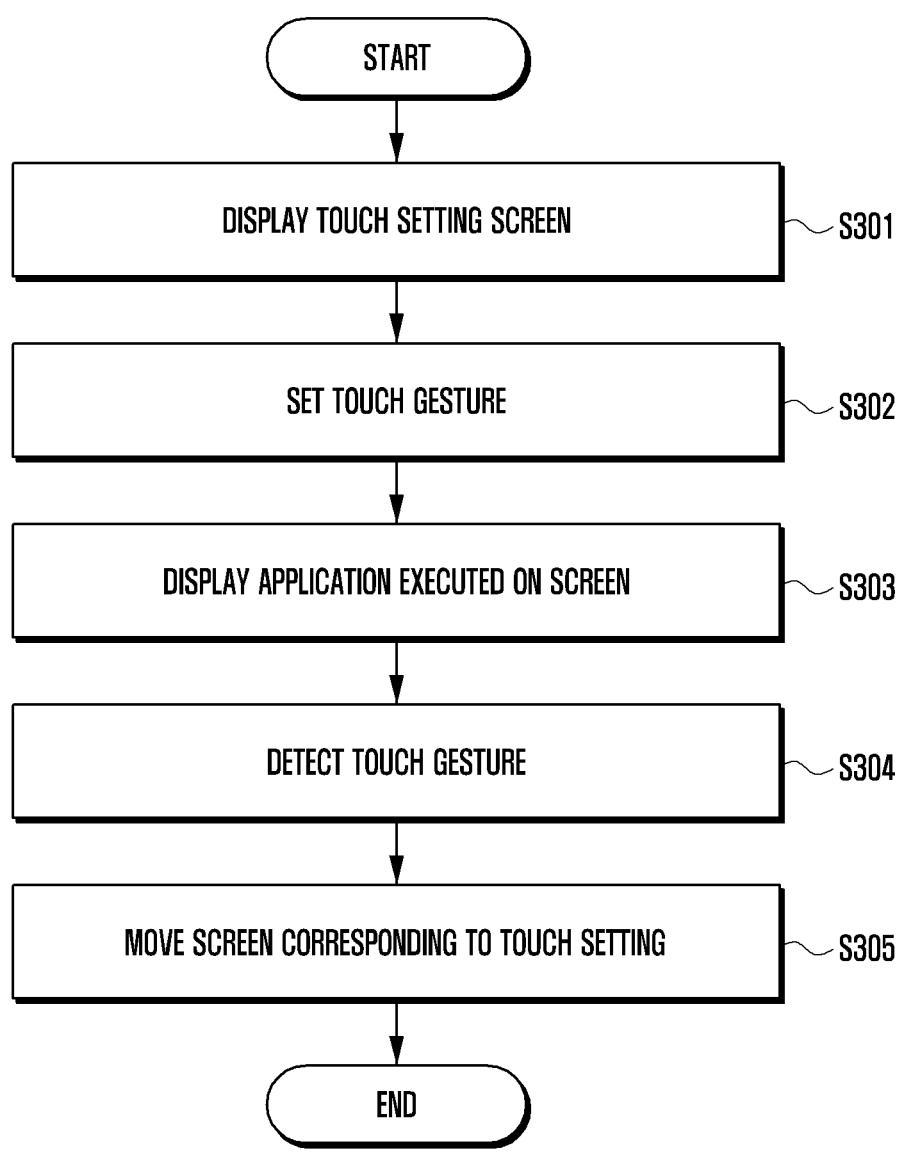
FIG. 3A is a flowchart illustrating a method for controlling a screen of a portable device according to an embodiment of the present disclosure.

FIG. 3A is a schematic flowchart illustrating a method for controlling a screen of a portable device according to an embodiment of the present disclosure.

Figure 4A:
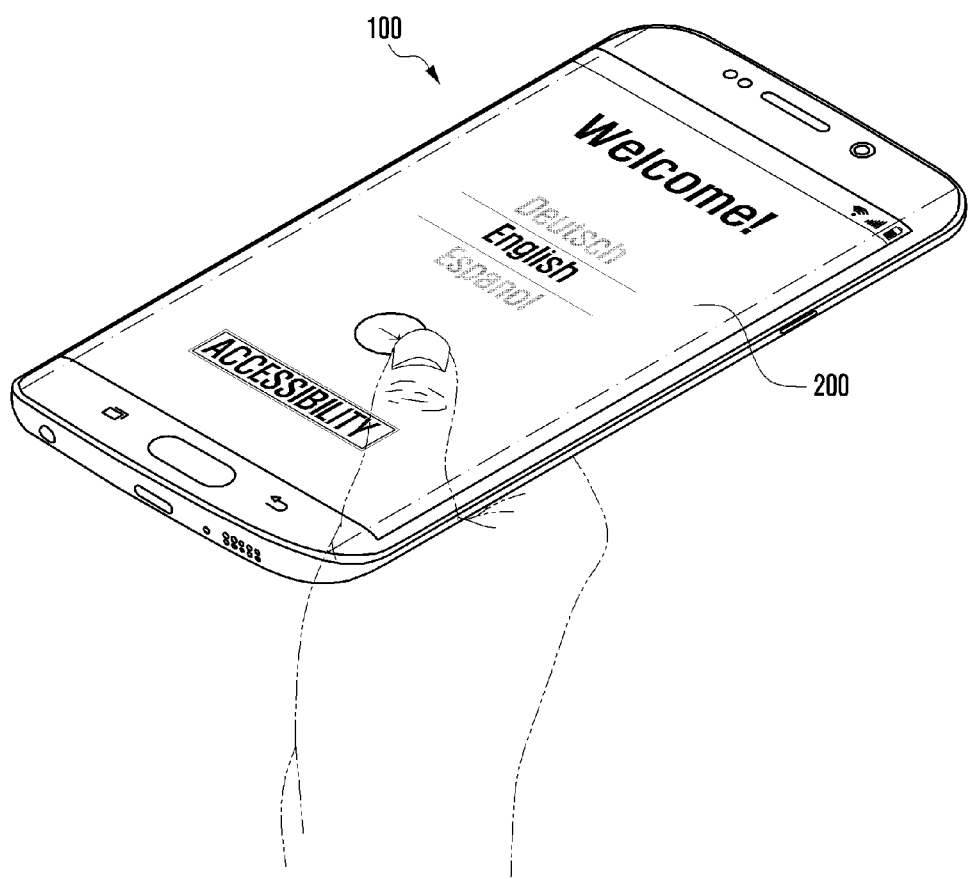
FIG. 4A illustrates an accessibility screen according to an embodiment of the present disclosure.

FIGS. 4A to 4O are views illustrating screen examples of a portable device according to an embodiment of the present disclosure.

At operation S301 of FIG. 3A, a gesture setting screen is displayed. In more detail, referring to FIGS. 4A and 4B, a gesture setting screen 400 is displayed on the edge touch screen 190. The gesture setting screen 400 may be called a "first screen".

The first screen 400 may be displayed on the portable device that is initially booted under the control of the control unit 110. Further, referring to FIGS. 4N to 4O, the first screen 400 may be displayed by user's touches 211 and 212.

In the case where a home screen 191 of the portable device 100 or an application is displayed, a user may display a notification bar 201 through a separate touch gesture (not illustrated). The user touches 211 an environment setting 191s of the notification bar 201. The control unit 110 may display an environment setting screen 202 that corresponds to the touch 211. The user touches 212 a gesture setting 202a on the environment setting screen 202. The control unit 110 may display the first screen 400 (see FIG. 4B) that corresponds to the touch 212.

The user may perform the gesture setting, for example, through initial booting and the first screen 400 (see FIG. 4B) that is displayed after the initial booting.

In the case of the portable device 100 that is initially booted, various items (e.g., language 200, Wi-Fi setting (not illustrated), fingerprint setting (not illustrated), gesture setting 400 (see FIG. 4C), or voice setting (not illustrated) for voice recognition) may be set by the user. The setting items as described above are exemplary, and such are not limited to the settings shown.

It will be understood by those of ordinary skill in the art to which the present disclosure pertains that the items that can be set in the initially booted portable device 100 may be changed, added, or deleted corresponding to the manufacturer, OS and/or function of the portable device 100.

The gesture setting may result in having user-customized touch gesture settings in consideration of various hand sizes and/or various finger lengths of users. The touch gesture may include drag, flick, swipe, pinch, or spread. The touch gesture may include a single-touch gesture and a multi-touch gesture.

The gesture setting may include screen scroll, screen scale-up, or screen scale-down through the drag, flick, swipe, pinch, or spread. Further, the gesture setting may include application execution (e.g., call, messenger execution, or execution of another application) or application end (e.g., alarm end or call rejection) through the drag, flick, swipe, pinch, or spread gestures.

The user may set the user customized touch gesture on the edge touch screen 190 of the portable device 100 through the gesture setting. Through the gesture setting, the control unit 110 of the portable device 100 can perform the screen scroll, screen scale-up, or screen scale-down in accordance with the user customized touch gesture.

Through the gesture setting, the control unit 110 of the portable device 100 can perform the screen scroll, screen scale-up, or screen scale-down.

At operation S302 of FIG. 3A, the touch gesture is set. In more detail, referring now to FIGS. 4B to 4F, on the gesture setting screen 400, the touch gesture is set by the user.

Figure 4B:
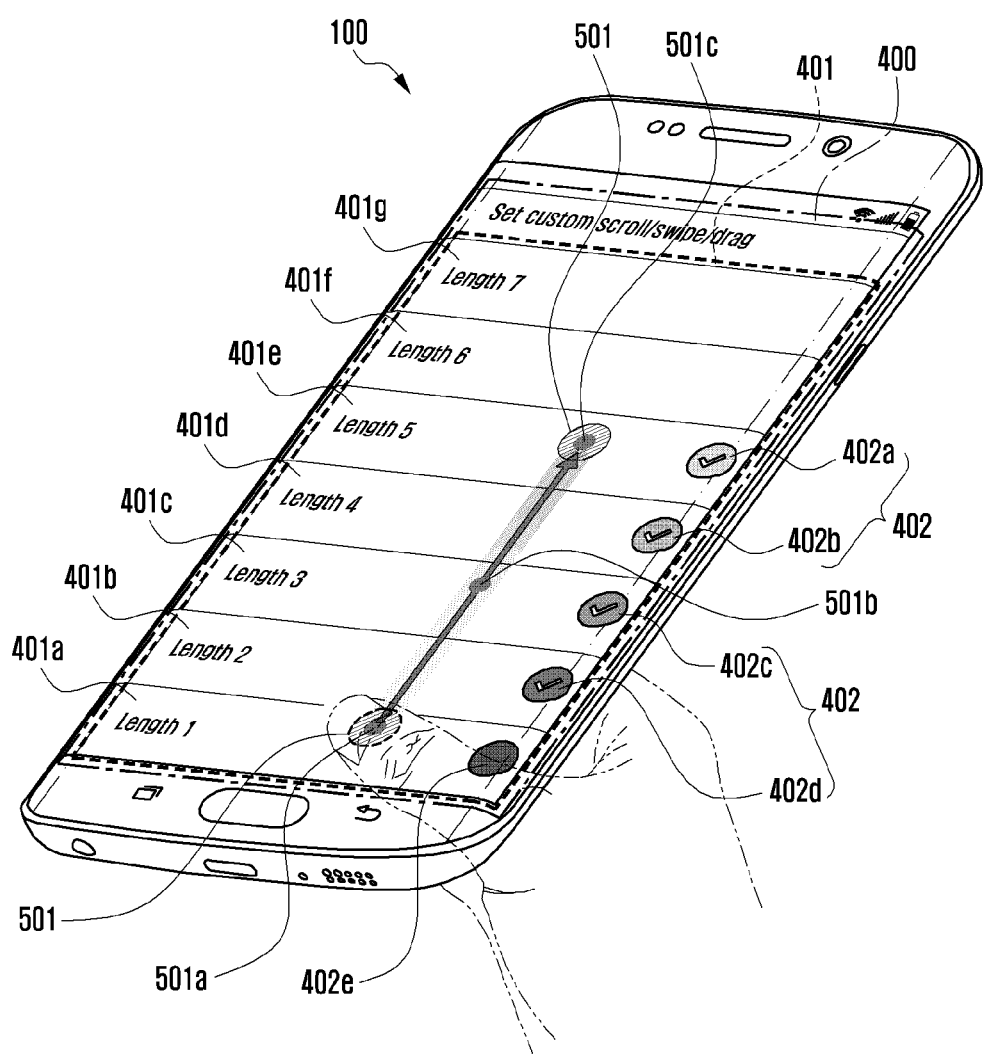
FIG. 4B and FIG. 4C illustrates gesture setting screens in for gestures performed in a vertical direction according to an embodiment of the present disclosure.

FIG. 4B illustrates touch gesture setting in vertical direction. Further, FIG. 4D illustrates touch gesture setting in horizontal direction.

Figure 4C:
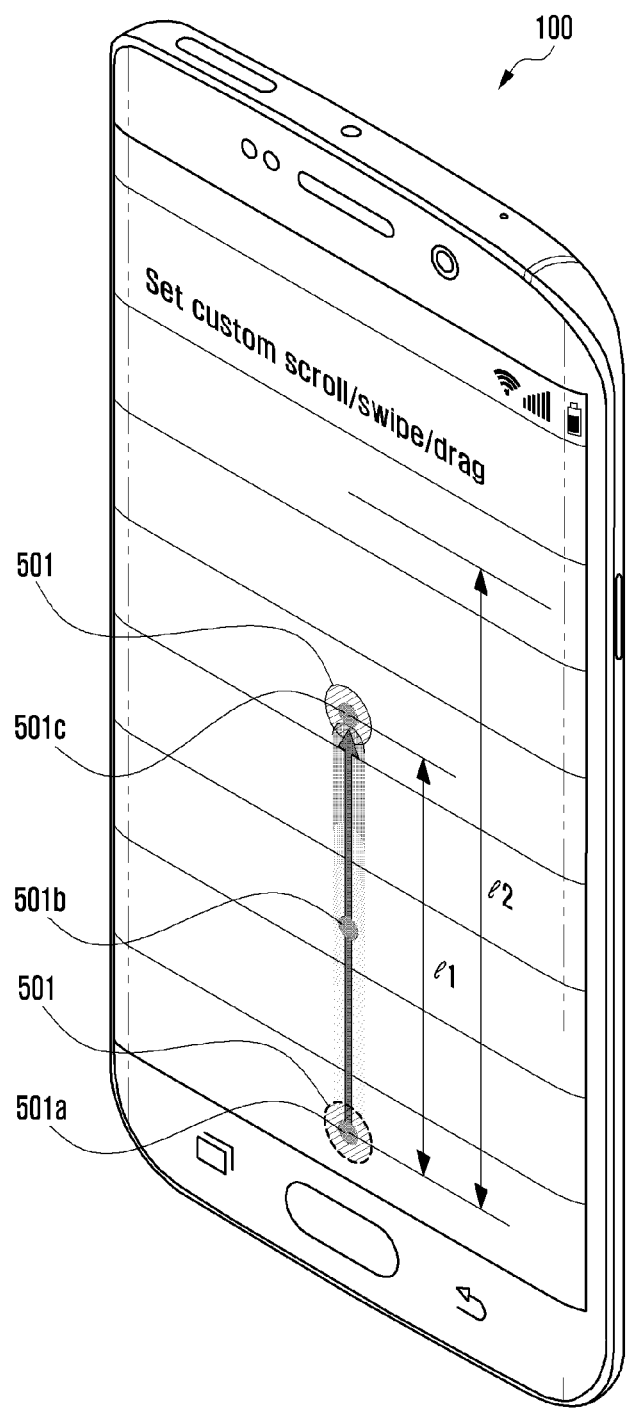
Figure 4D:
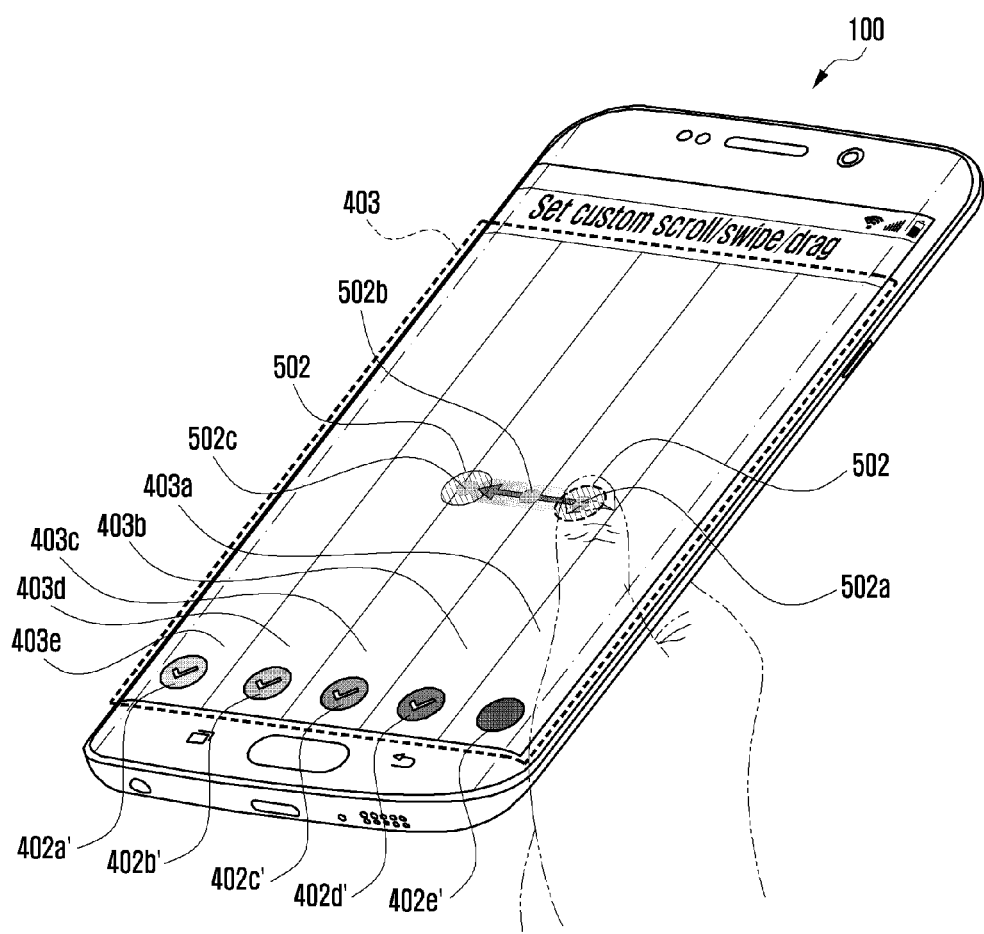
FIG. 4D illustrates an initial gesture setting screen for gestures performed in a horizontal direction.

Referring now to FIGS. 4B and 4C, a touch gesture length detection region 401 for detecting the user's touch gesture length may be included in the gesture setting screen 400. The touch gesture length detection region 401 may be divided into a plurality of detection regions, for example, 401*a* to 401*g*. The number of the plural detection regions as described above is exemplary, and it will be understood by those of ordinary skill in the art to which the present disclosure pertains that the number of the detection regions may be changed (e.g., the number of the detection regions may be 1, 2, 3, 4, 5, 6, 7, 8, or more) in accordance with the size or resolution of the edge touch screen 190 of the portable device 100.

A counter 402 that indicates the number of times of touch gesture input may be included in the gesture setting screen 400. Referring to FIG. 4B, the number of times of input touch gestures is 4 (e.g., in the case where counters 402*a* to 402*e* have checkmarks). The number of times of touch gestures that can be input may be 5 (the number of times can be changed through the setting).

The user may make a touch gesture (e.g., continuous movement of a touch from an initial touch 501*a* to the last touch 501*c*) on the touch gesture length detection region 401.

The control unit 110 may detect (or calculate) the continuous movement (e.g., a plurality of X and Y coordinates corresponding to a continuous touch) of the first touch 501 using the edge touch screen 190 and the edge touch screen controller 195. The continuous movement of the first touch 501 may be stored in the storage unit 175 under the control of the control unit 110.

The continuous movement in a substantially vertical direction (e.g., movement from the initial location 501*a* to the last location 501*c* such as shown in FIG. 4B) of the first touch 501 may mean a first touch gesture that is detected through the main touch screen 190*a*. The continuous movement of the first touch 501 may mean the first touch gesture that is detected from the main touch screen 190*a* to one of the edge touch screens 190*b* and 190*c*.

The continuous movement (e.g., movement from the initial location 501*a* to the last location 501*c* such as shown in FIG. 4B) of the first touch 501 may mean that the contact of the first touch 501 is continuously maintained on the main touch screen 190*a*. The continuous movement of the first touch 501 may mean that the contact of the first touch 501 is continuously maintained from the main touch screen 190*a* to one of the edge touch screens 190*b* and 190*c*.

The direction of the continuous movement of the first touch 501 may be made in an upward direction, a downward direction, and/or a lateral direction. Although it is described that the trajectory of the first touch gesture as described above is in the form of a straight line, it may be in the form of a straight line having a slope or in the form of a curve having a curvature.

As for the continuous movement of the first touch 501, the touch with the main touch screen 190*a* may be released at the last location 501*c*.

In an embodiment of the present disclosure, with reference to FIG. 4C, a plurality of touches may be included in the "continuous movement of the touch". The three touch locations 501*a* to 501*c* as described above are exemplary, and are not limited thereto. It will be understood by those of ordinary skill in the art to which the present disclosure pertains that the number of touches included in the continuous movement of the touch may be changed.

Referring now to FIG. 4B, the continuous movement of the first touch 501 in the touch gesture length detection region 401 may include drag, drag & drop, flick, or swipe. Further, as for the touch gesture, the continuous movement of the first touch 501 in the touch gesture length detection region 401 may include a single-touch gesture and a multi-touch gesture.

In the case where the user makes the touch gesture 5 times in the touch gesture length detection region 401, the control unit 110 may calculate an average of the lengths of the respectively input touch gestures (e.g., 11). The control unit 110 may calculate a ratio of the average length of the touch gesture to the maximum length (e.g., 12) of the touch gestures that can be detected in the touch gesture length detection region 401 using the calculated average length of the touch gestures. For example, if the ratio of the calculated average length of the touch gesture to the maximum length of the touch gesture is 0.5, the control unit 110 may multiply the ratio (0.5) between the average length and the maximum length by a weight value (e.g., 2).

In the case of the user having the ratio (0.5) between the calculated average length and the maximum length, the control unit 110 may multiply the detected length of the touch gesture by the weight value (e.g., 2). In the case of the touch gesture having a length that is shorter than the calculated average length, the control unit 110 may multiply the detected length of the touch gesture by the weight value (e.g., 2). Further, in the case of the touch gesture having a length that is longer than the calculated average length, the control unit 110 may make the detected length of the touch gesture correspond to the maximum length (e.g., 12).

Through the weight value, the control unit 110 may move the screen (i.e. control presentation of the screen), like the touch gesture (not illustrated) that is input with the maximum length, in place of the input touch gesture length. Further, through the weight value, the control unit 110 may change the screen being displayed to another screen, like the touch gesture (not illustrated) that is input with the maximum length, in place of the input touch gesture length.

The ratio between the calculated average length and the maximum length and the weight value may be stored in the storage unit 175 as vertical gesture setting information under the control of the control unit 110. The stored vertical gesture setting information may include a touch gesture Identifier (ID) for history management, the number of times of touch gestures, each touch gesture length, the maximum touch gesture length, an average touch gesture length, a weight value, or each touch gesture input time.

Figure 4E:
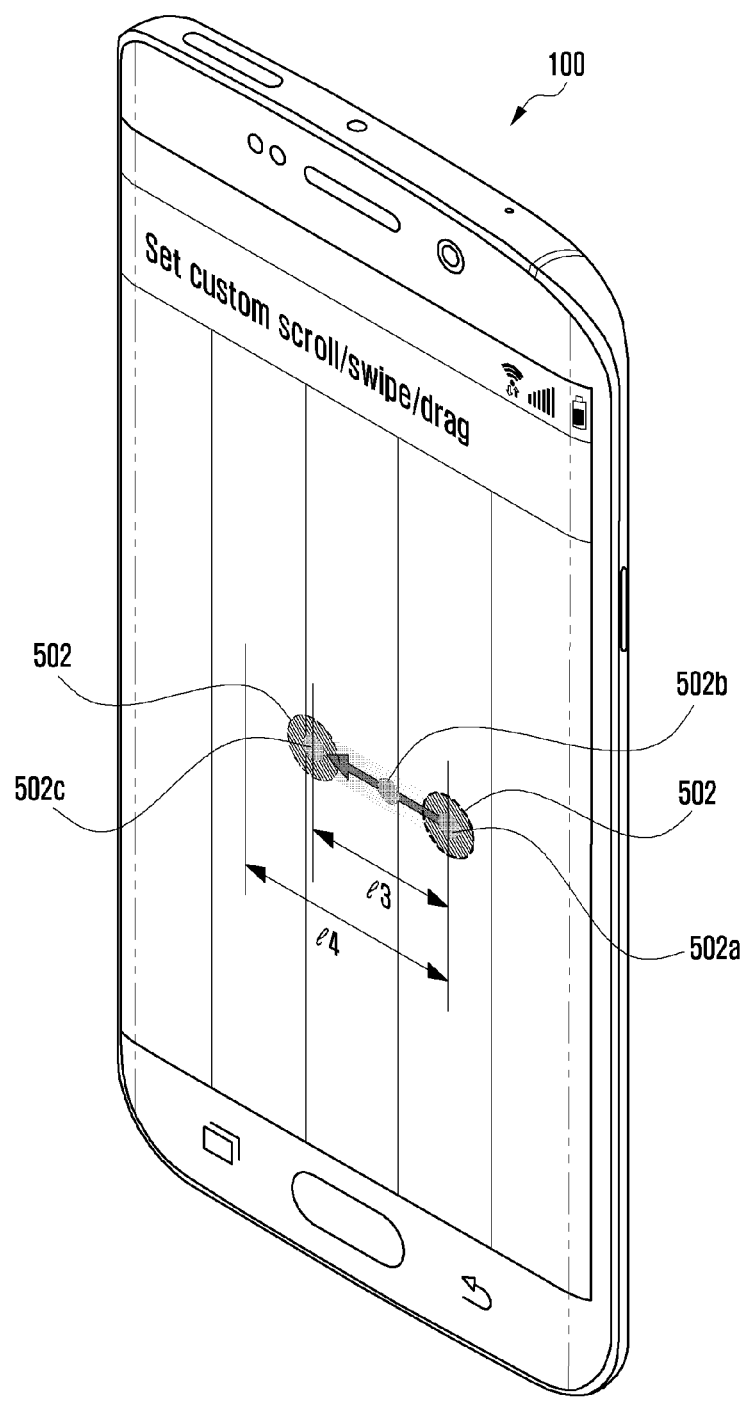
FIG. 4E further illustrates another gesture setting screen in the horizontal direction.

Referring to FIGS. 4D and 4E, a touch gesture setting operation in a horizontal direction is illustrated. A touch gesture length detection region 403 for detecting the user's touch gesture length may be included in the gesture setting screen 400. The touch gesture length detection region 403 may be divided into a plurality of detection regions, for example, 403a to 403e. The number of the plural detection regions as described above is exemplary, and it will be understood by those of ordinary skill in the art to which the present disclosure pertains that the number of the detection regions may be changed (e.g., the number of the detection regions may be 1, 2, 3, 4, or more) in accordance with the size or resolution of the display unit 170 of the portable device 100.

A counter 404 that indicates the number of times of touch gesture input may be included in the gesture setting screen 400. Referring to FIG. 4D, the number of times of input touch gestures is 4 (e.g., in the case where counters 404a to 404e have checkmarks). The number of times of touch gestures that can be input may be, for example, 5 (the number of times can be changed through the setting).

The user may make a touch gesture (e.g., continuous movement of a touch from an initial touch 502a to the last touch 502c) on the touch gesture length detection region 403.

The control unit 110 may detect (or calculate) the continuous movement (e.g., a plurality of X and Y coordinates corresponding to a continuous touch) of the second touch 502 using the edge touch screen 190 and the edge touch screen controller 195. The continuous movement of the second touch 502 may be stored in the storage unit 175 under the control of the control unit 110.

The continuous movement in a substantially horizontal direction (e.g., movement from the initial location 502a to the last location 502c such as shown in FIG. 4E) of the second touch 502 may mean a second touch gesture that is detected through the main touch screen 190a. The continuous movement (e.g., movement from the initial location 502a to the last location 502c) of the second touch 502 may mean the second touch gesture that is detected from the main touch screen 190a to one of the edge touch screens 190b and 190c.

The continuous movement (e.g., movement from the initial location 502a to the last location 502c) of the second touch 502 may mean that the contact of the second touch 502 is continuously maintained on the main touch screen 190a. The continuous movement (e.g., movement from the initial location 502a to the last location 502c) of the second touch 502 may mean that the contact of the second touch 502 is continuously maintained from the main touch screen 190a to one of the edge touch screens 190b and 190c.

The direction of the continuous movement of the second touch 502 may be not only a left direction but also a right direction, an upward direction, and a downward direction. Although it is described that the trajectory of the second touch gesture as described above is in the form of a straight line, it may be in the form of a straight line having a slope or in the form of a curve having a curvature.

As for the continuous movement of the second touch 502, the touch with the main touch screen 190a may be released at the last location 502c.

In an embodiment of the present disclosure, a plurality of touches may be included in the "continuous movement of the touch". The three touch locations 502a to 50c as described above are exemplary, and are not limited thereto. It will be understood by those of ordinary skill in the art to which the present disclosure pertains that the number of touches included in the continuous movement of the touch may be changed.

Referring now to FIG. 4D, the continuous movement of the second touch 502 in the touch gesture length detection region 402 may include drag, drag & drop, flick, or swipe. Further, as for the touch gesture, the continuous movement of the second touch 502 in the touch gesture length detection region 402 may include a single-touch gesture and a multi-touch gesture.

In the case where the user makes the touch gesture 5 times in the touch gesture length detection region 402, the control unit 110 may calculate an average of the lengths of the respectively input touch gestures (e.g., 13). The control unit 110 may calculate a ratio of the average length of the touch gesture to the maximum length (e.g., 14) of the touch gestures that can be detected in the touch gesture length detection region 402 using the calculated average length of the touch gestures. For example, if the ratio of the calculated average length of the touch gesture to the maximum length of the touch gesture is 0.4, the control unit 110 may multiply the ratio (0.4) between the average length and the maximum length by a weight value (e.g., 2.5).

In the case of the user having the ratio (0.4) between the calculated average length and the maximum length, the control unit 110 may multiply the detected length of the touch gesture by the weight value (e.g., 2.5). In the case of the touch gesture having a length that is shorter than the calculated average length, the control unit 110 may multiply the detected length of the touch gesture by the weight value (e.g., 2.5). Further, in the case of the touch gesture having a length that is longer than the calculated average length, the control unit 110 may make the detected length of the touch gesture correspond to the maximum length (e.g., 14).

Through the weight value, the control unit 110 may move the screen, like the touch gesture (not illustrated) that is input with the maximum length. Further, through the weight value, the control unit 110 may change the screen to another screen, like the touch gesture (not illustrated) that is input with the maximum length.

The ratio between the calculated average length and the maximum length and the weight value may be stored in the storage unit 175 as vertical gesture setting information under the control of the control unit 110. The stored vertical gesture setting information may include a touch gesture Identifier (ID) for history management, the number of times of touch gestures, each touch gesture length, the maximum touch gesture length, an average touch gesture length, a weight value, or each touch gesture input time.

Figure 4F:
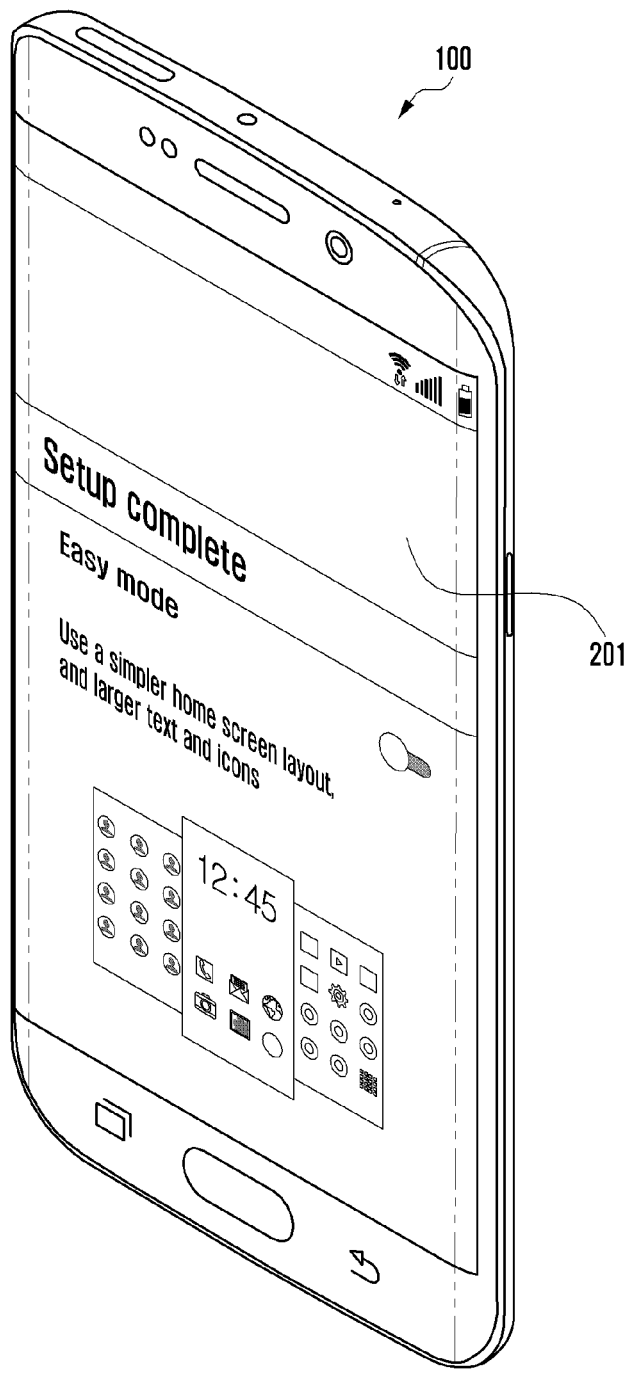
FIG. 4F illustrates a screen indicating completion of the setting of various items of the portable device.
Figure 4G:
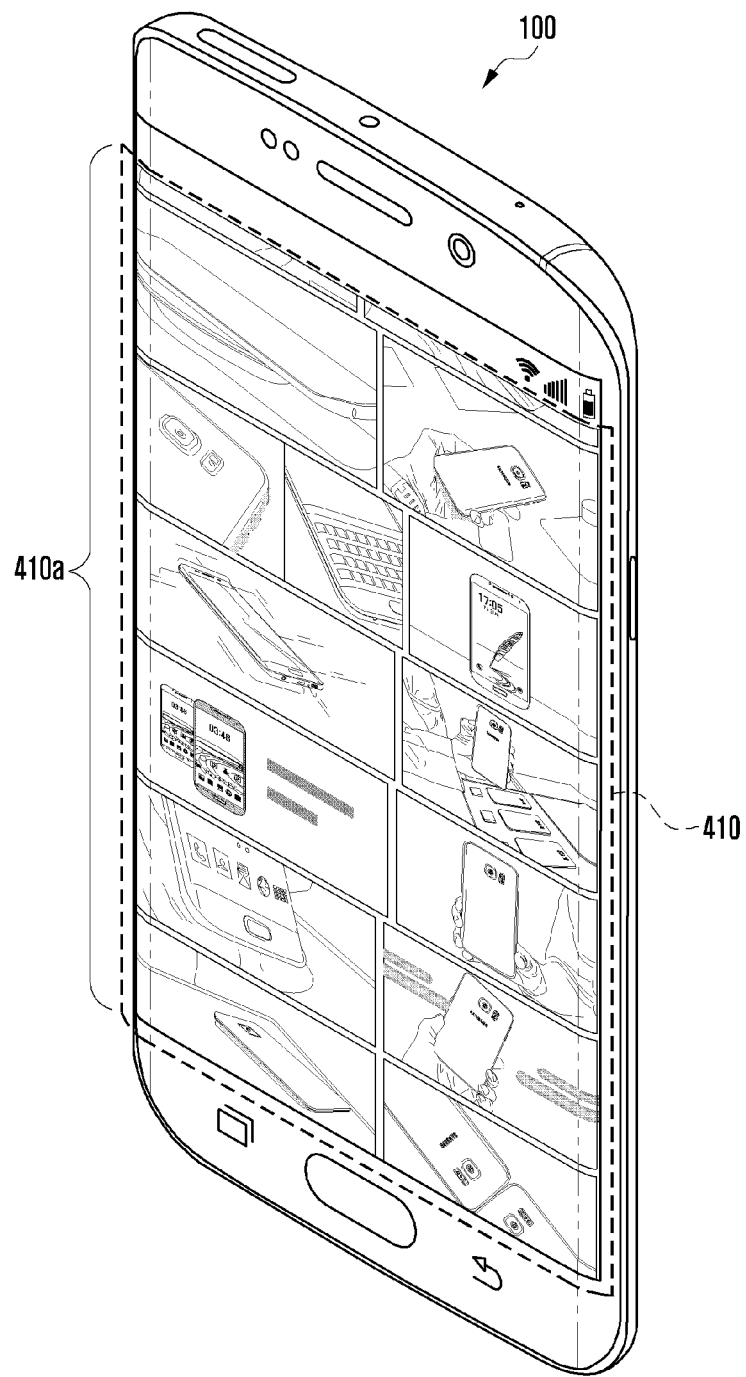
FIG. 4G and FIG. 4H respectively illustrate a display and a selection of one of shortcut icons displayed on a screen of the portable device.
Figure 4H:
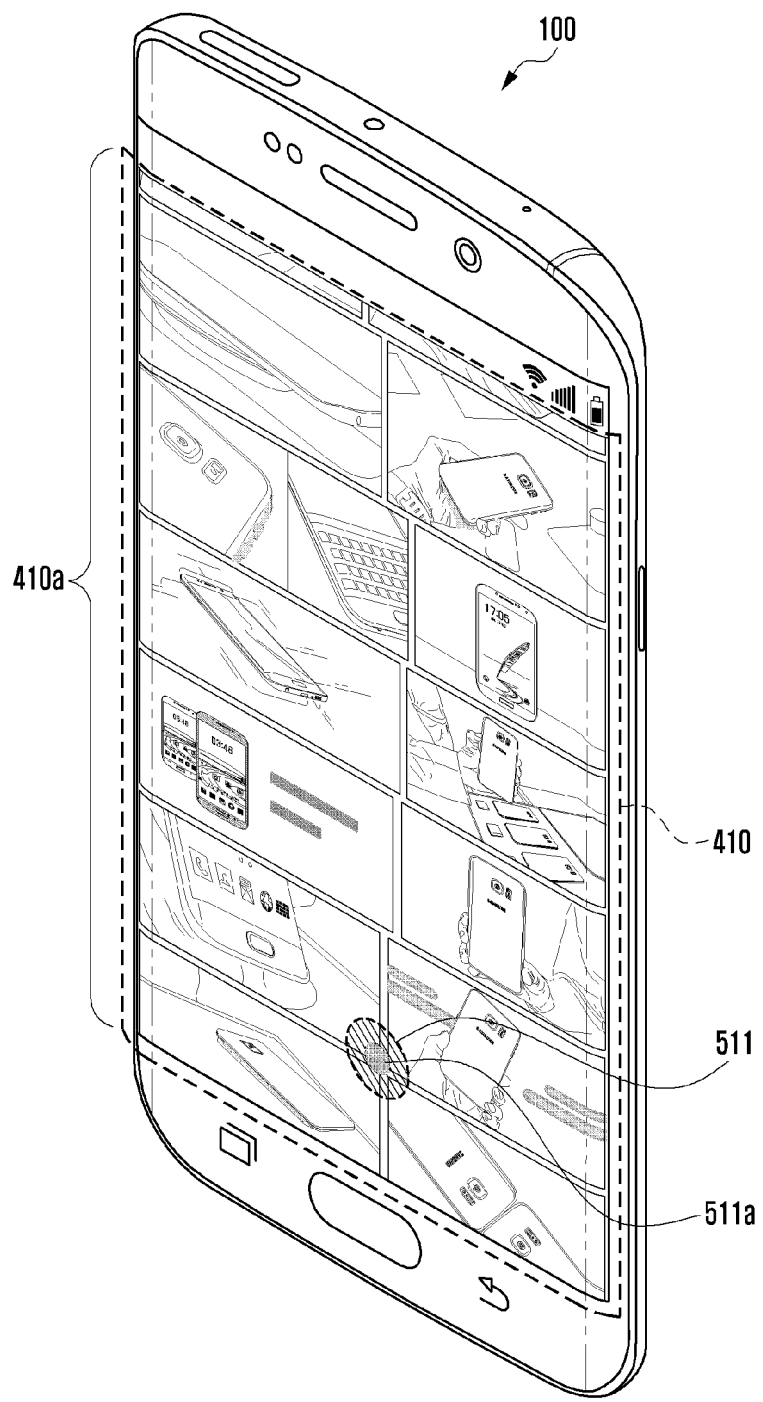
Figure 4I:
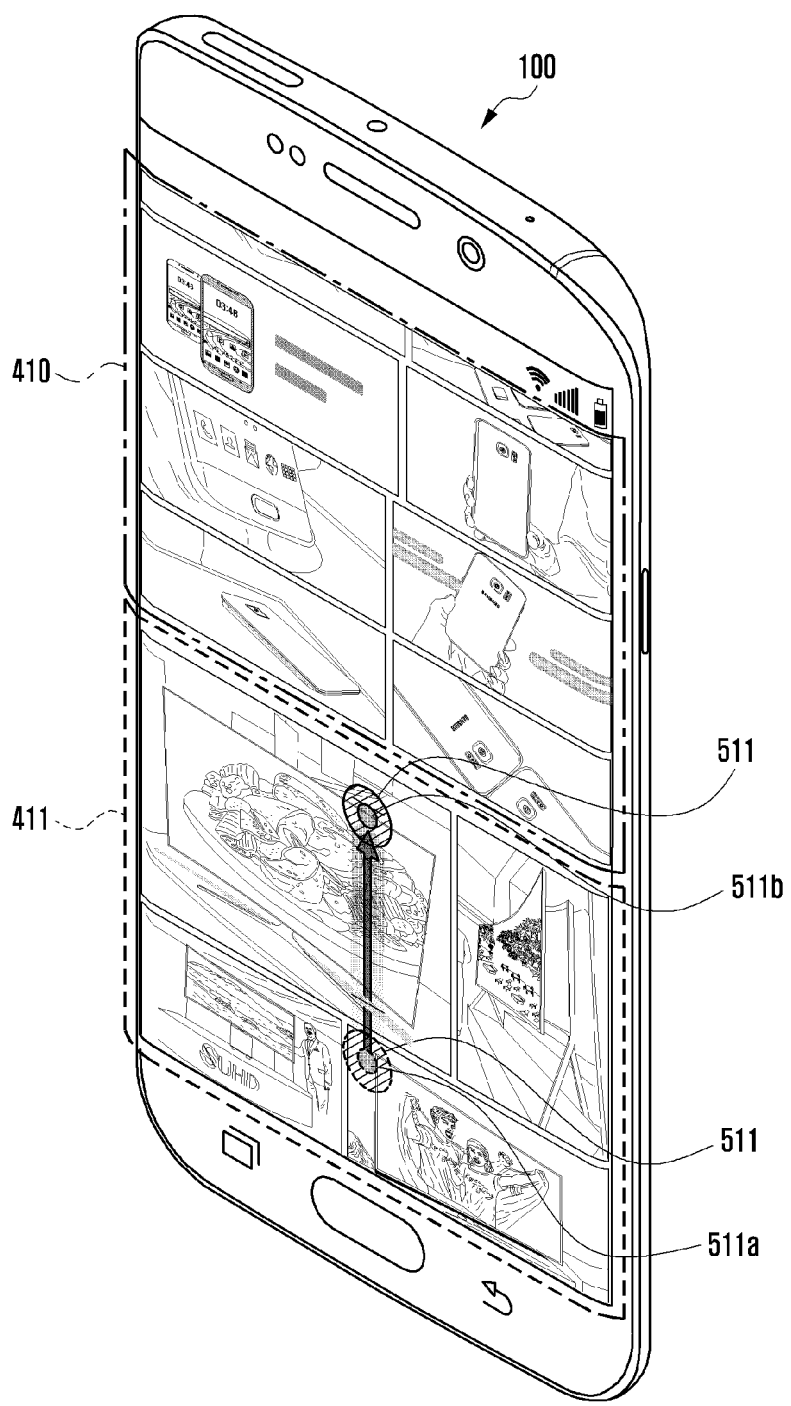
FIG. 4I and FIG. 4J illustrate movement of items being displayed in response to a gesture.

Referring now to FIG. 4F, setting of various items of the portable device 100 that is initially booted may be completed 201. As shown in FIGS. 4B and 4C, the setting of the touch gesture in the vertical direction may be completed by the user, and as shown in FIGS. 4D and 4E, the setting of the touch gesture in the horizontal direction may be completed by the user.

At operation S303 of FIG. 3A, an executed application is displayed on the screen. In more detail, referring now to FIG. 4G, the user touches (not illustrated) one (e.g., photo gallery) of shortcut icons 191a (see FIG. 1A) displayed on the screen of the portable device 100.

The control unit 110 may execute an application (e.g., photo gallery) that corresponds to the touch. The control unit 110 may display the 11$^{th}$ screen 410 of the executed application. The 11$^{th}$ screen 410 may include a plurality of photos 410a.

The 11$^{th}$ screen 410 may be a screen of another application (e.g., web browser). If a friend list (not illustrated) or a timeline (not illustrated), which is provided from a messenger program (not illustrated) that is one of applications, is longer than the length (horizontal length or vertical length) of the edge touch screen 190 in the 11$^{th}$ screen 410, the friend list (not illustrated) or the timeline (not illustrated) may be provided as a plurality of screens.

If a page (not illustrated) that is provided from a word processor (not illustrated) that is one of applications, a spreadsheet program (not illustrated) and/or a presentation program (not illustrated) is longer than the length (horizontal length or vertical length) of the edge touch screen 190 in the 11$^{th}$ screen 410, the page (not illustrated) may be provided as a plurality of screens.

If the timeline (not illustrated) in a Social Network Service (SNS) application that comprises applications is longer than the length (horizontal length or the vertical length) of the edge touch screen 190, the timeline (not illustrated) may be provided as a plurality of screens.

It will be understood by those of ordinary skill in the art to which the present disclosure pertains that applications that provide a plurality of screens are not limited to the above-described applications, but may be diversely changed.

If the number of photos that can be displayed in the photo gallery is 100, and the number of images that are displayed on one screen is 10, the total number of screens that are provided by the control unit 110 in the photo gallery may be 10. If the total number of photos is 500, and the number of images that are displayed on one screen is 20, the total number of screens that are provided from the photo gallery may be 25.

At operation S304 of FIG. 3A, the touch gesture is detected. In more detail, referring to FIGS. 4H to 4J, the user inputs the 11$^{th}$ touch gesture (e.g., from the initial location 511a to the last location 511c) on the 11$^{th}$ screen 410.

The control unit 110 may detect (or calculate) the continuous movement (e.g., a plurality of X and Y coordinates corresponding to the continuous touch) of the 11$^{th}$ touch 511 using the edge touch screen 190 and the edge touch screen controller 195. The continuous movement of the 11th touch 511 may be stored in the storage unit 175 under the control of the control unit 110.

At operation S305 of FIG. 3A, the screen is moved to correspond to the gesture setting. In more detail, referring to FIGS. 4I and 4J, the control unit 110 may move the 11$^{th}$ screen 410 corresponding to the 11$^{th}$ touch gesture.

In the case where the 11$^{th}$ touch gesture is moved (e.g., from 511a to 511b), the control unit 110 may move the 11$^{th}$ screen 410 upward in accordance with the movement direction of the 11$^{th}$ touch gesture. In the case where the 11$^{th}$ touch gesture is moved (e.g., from 511a to 511b), the control unit 110 may move the 11$^{th}$ screen 410 upward using the stored vertical gesture setting.

In the case where the 11$^{th}$ touch gesture is moved (e.g., $^{2}/_{5}$ of an average length in the stored gesture setting), the control unit 110 may move the 11$^{th}$ screen 410 for about $^{2}/_{5}$ upward using the stored vertical gesture setting.

In the case where the 11$^{th}$ touch gesture is moved (e.g., from 511a to 511b, for about a half ($^{1}/_{2}$) of the average length in the stored gesture setting), the control unit 110 may move the 11$^{th}$ screen 410 for about $^{1}/_{2}$ upward using the stored vertical gesture setting.

The control unit 110 may not display a photo that is located at an upper end of the 11$^{th}$ screen 410 corresponding to an upward movement of the 11$^{th}$ screen 410. The control unit 110 may move the 12$^{th}$ screen 411 that follows the 11$^{th}$ screen 410 upward corresponding to the upward movement of the 11$^{th}$ screen 410. The control unit 110 may move the 12$^{th}$ screen 411 that follows the 11$^{th}$ screen 410 upward together corresponding to the upward movement of the 11$^{th}$ screen 410.

Until the touch of the 11$^{th}$ touch gesture is released in the portable device 100, the control unit 110 may move the 12$^{th}$ screen 411 that follows the 11$^{th}$ screen 410 upward together.

The control unit 110 may operate to make the movement distance of the 11$^{th}$ touch gesture that is detected in accordance with the gesture setting different than the movement distance of the 11$^{th}$ screen 410. Further, the control unit 110 may operate to make the movement distance of the 11$^{th}$ screen 410 differ from the detected movement distance of the 11$^{th}$ touch gesture in accordance with the gesture setting. For example, if the same movement distance of the 11$^{th}$ touch gesture is detected, the control unit 110 may operate to make the movement distance of the 11$^{th}$ screen 410 differ from the detected movement distance of the 11$^{th}$ touch gesture in accordance with the gesture setting.

Figure 4J:
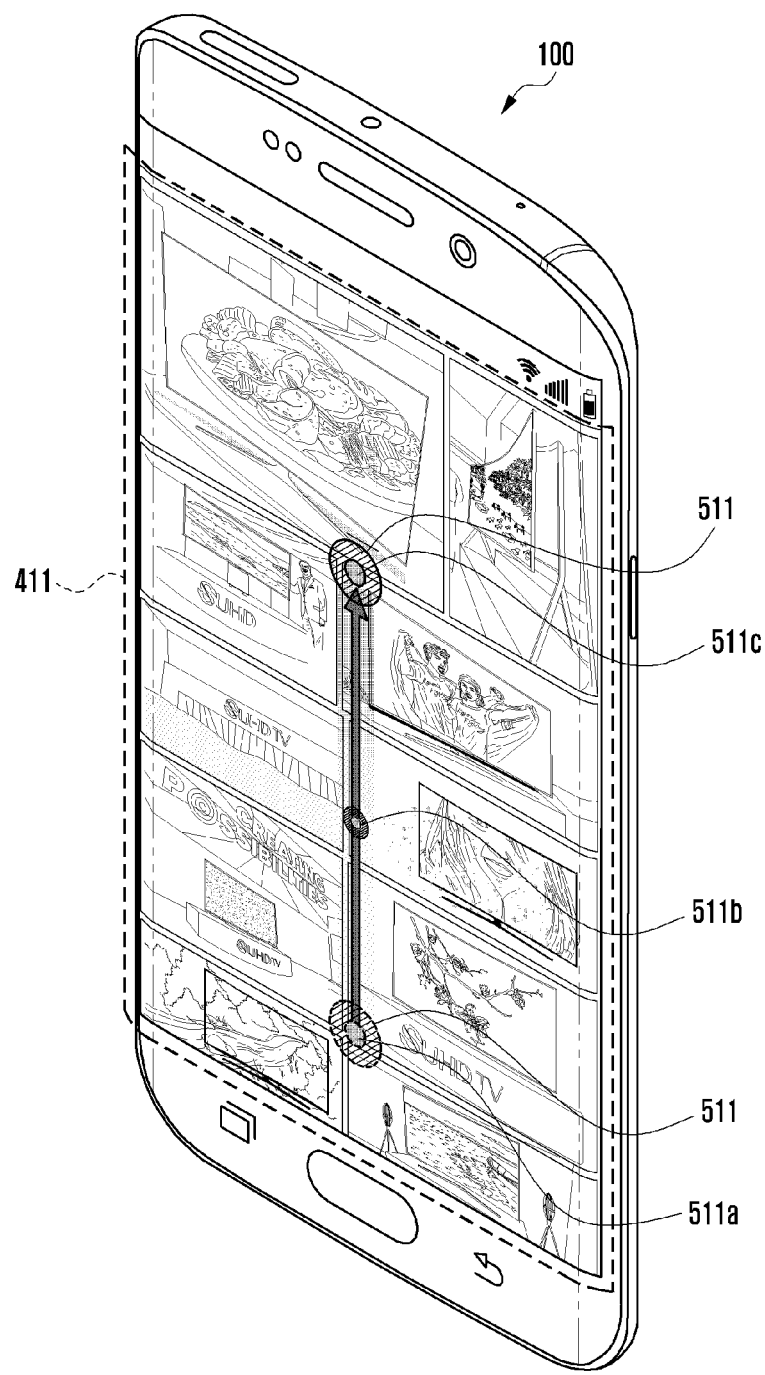

Referring now to FIG. 4J, in the case where the 11$^{th}$ touch gesture is moved (e.g., from the initial location 511a to the last location 511b) for the average movement distance, the control unit 110 may display the 12$^{th}$ screen 411. In the case where the 11$^{th}$ touch gesture is moved (e.g., the contact of the 11$^{th}$ touch gesture is released) for the average length, the control unit 110 may display the 12$^{th}$ screen 411 to be larger than the 11$^{th}$ screen 410 (e.g., so that the area of the 12$^{th}$ screen being displayed becomes larger than the area of the 11$^{th}$ screen).

The movement of the 11$^{th}$ touch gesture has the same meaning as the meaning of the continuous movement of the 11$^{th}$ touch.

The control unit 110 may provide the user with a feedback that corresponds to arrival of the 11$^{th}$ touch 511 at the last location 511c. The feedback may be provided as one of visual feedback, auditory feedback, and tactile feedback. Further, the control unit 110 may provide the user with a combination of the visual feedback, the auditory feedback, and the tactile feedback.

The visual feedback may include visual effects (e.g., animation effects of a separate image or a fade that is applied to the separate image).

The control unit 110 may display the visual feedback on the edge touch screen 190. The control unit 110 may display the visual feedback on one of the main touch screen 190a, the first edge touch screen 190b, and the second edge touch screen 190c. Further, the control unit 110 may display the visual effect in combination with the main touch screen 190a, the first edge touch screen 190b, and the second edge touch screen 190c.

The auditory feedback may include sound that corresponds to the arrival of the 11$^{th}$ touch 511 at the last location 511c. The control unit 110 may output the auditory feedback through the speaker 163. The control unit 110 may output the auditory feedback through one of the first speaker 163a and the second speaker 163b. Further, the control unit 110 may output the auditory feedback through a combination of the speakers 163a and 163b.

The tactile feedback may include vibration that corresponds to the arrival of the 11$^{th}$ touch 511 at the last location 511c. The control unit 110 may output the tactile feedback through the vibration motor 164. If a plurality of vibration motors are provided, the control unit 110 may selectively output the tactile feedback through one of the plurality of vibration motors.

A feedback providing time (e.g., 500 ms) that is provided to the user through environment setting (not illustrated) may be changed. Further, at least one of the plurality of feedbacks (e.g., visual feedback, auditory feedback, and tactile feedback) that are provided to correspond to the arrival of the 11$^{th}$ touch 511 at the last location 511c.

At operation S305 of FIG. 3A, in the case where the screen is moved to correspond to the gesture setting, the method for controlling the screen of a portable device is ended.

Figure 4K:
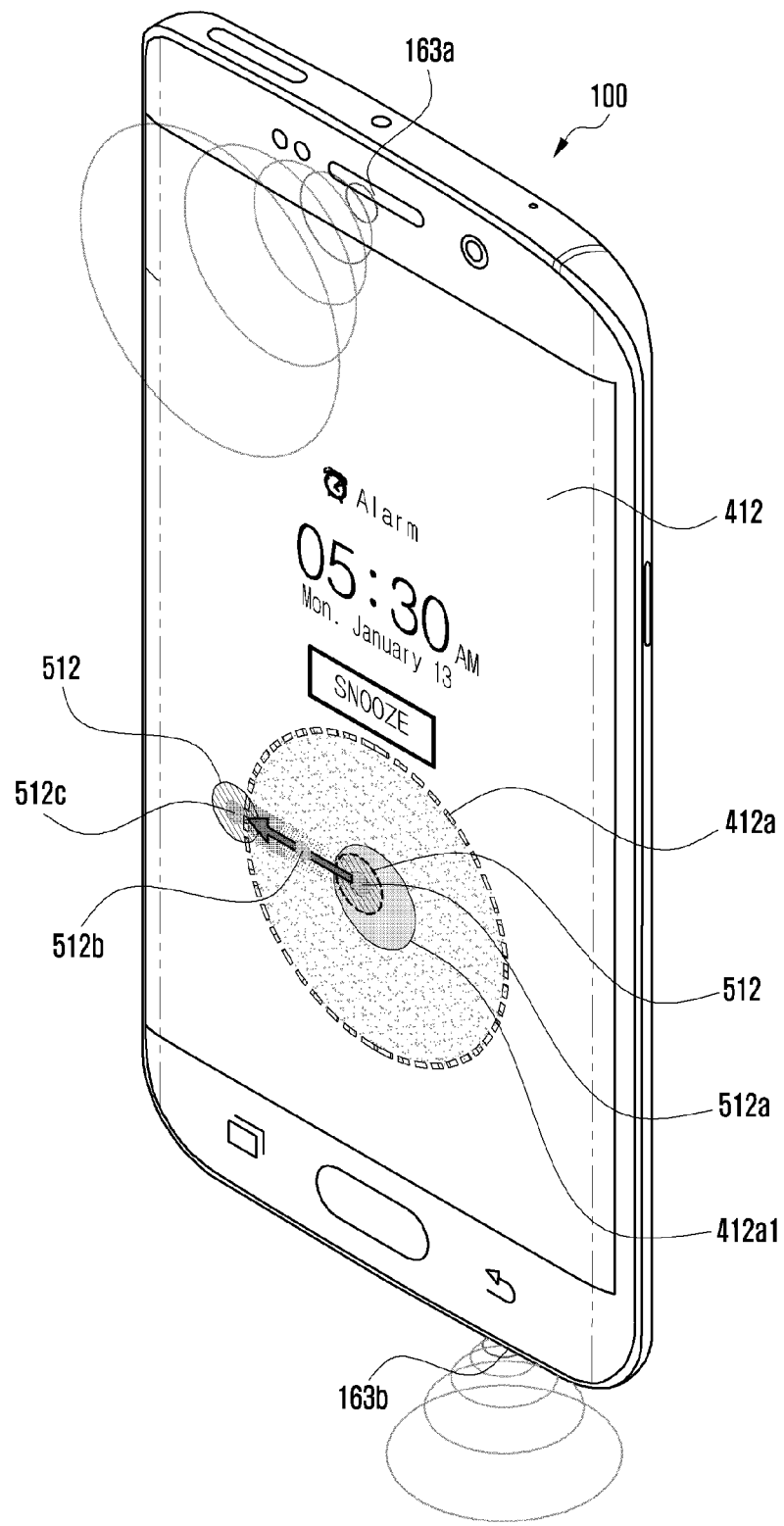
FIG. 4K illustrates soundwaves from an alarm being output from the speaker on the front surface of the portable device and a display of settings regarding the alarm.

Referring now to FIG. 4K, according to another embodiment of the present disclosure, an alarm is output from the speaker 163a on the front surface and a speaker (not illustrated) on the side surface at the lower end at a time (e.g., 05:30 AM) that is set in the portable device 100. The alarm may also be one application.

In the case where the alarm is output from the portable device 100, the user may release the output alarm using the 13$^{th}$ touch gesture on the 13$^{th}$ screen 412 of the portable device 100.

In the case where the alarm is output from the portable device 100, the user may input the 12$^{th}$ touch gesture 512 onto the 13$^{th}$ screen 412. The control unit 110 may detect (or calculate) the continuous movement (e.g., a plurality of X and Y coordinates that correspond to the continuous touch) of the 12$^{th}$ touch 512 using the edge touch screen 190 and the edge touch screen controller 195. The continuous movement of the 12$^{th}$ touch 512 may be stored in the storage unit 175 under the control of the control unit 110.

In the case where the 12$^{th}$ touch gesture is moved (e.g., from 512a toward 512b), the control unit 110 may determine whether to pass through an alarm release region 412a that corresponds to the alarm release of the 12$^{th}$ touch gesture. The alarm release region 412a may be a region having a radius of 2 cm based on an inner circle 412a1. The radius of the alarm release region 412a may be shorter than the average length at the stored horizontal gesture setting (e.g., the radius is shorter than the average length for 0.05 to 1 cm). Further, the radius of the alarm release region 412a may be equal to the average length at the stored horizontal gesture setting.

The radius of the alarm release region 412a can be varied to correspond to the user's hand size and/or finger length. In the case where the horizontal gesture setting is stored, the control unit 110 may change the radius of the alarm release region 412a that corresponds to the alarm release.

In the case where the 12$^{th}$ touch gesture passes through the alarm release region 412a, the control unit 110 may release the output alarm.

The movement of the 12$^{th}$ touch gesture may have the same meaning as the meaning of the continuous movement of the 12$^{th}$ touch.

The control unit 110 may release the alarm using the movement distance of the 12$^{th}$ touch gesture that is detected in accordance with the gesture setting. Further, the control unit 110 may make the alarm release correspond to the detected movement distance of the 12$^{th}$ touch gesture in accordance with the gesture setting. For example, in the case where the same movement distance of the 12$^{th}$ touch gesture is detected, the control unit 110 may release the alarm to correspond to the movement distance (e.g., whether to pass through the alarm release region 412a) of the 12$^{th}$ touch gesture in accordance with the gesture setting, or may maintain the alarm.

The control unit 110 may provide the user with a feedback that corresponds to the passage of the 12$^{th}$ touch 512 through the alarm release region 412a. The provided feedback may be provided as one of the visual feedback, the auditory feedback, and the tactile feedback. Further, the control unit 110 may provide the user with combinations of the visual feedback, the auditory feedback, and the tactile feedback.

Since the feedback that corresponds to the passage of the 12$^{th}$ touch 512 through the alarm release region 412a is substantially similar (e.g., touch gesture difference) to the feedback that corresponds to the arrival of the 11$^{th}$ touch 511 at the last location 511c, the duplicate explanation thereof will be omitted.

Figure 4L:
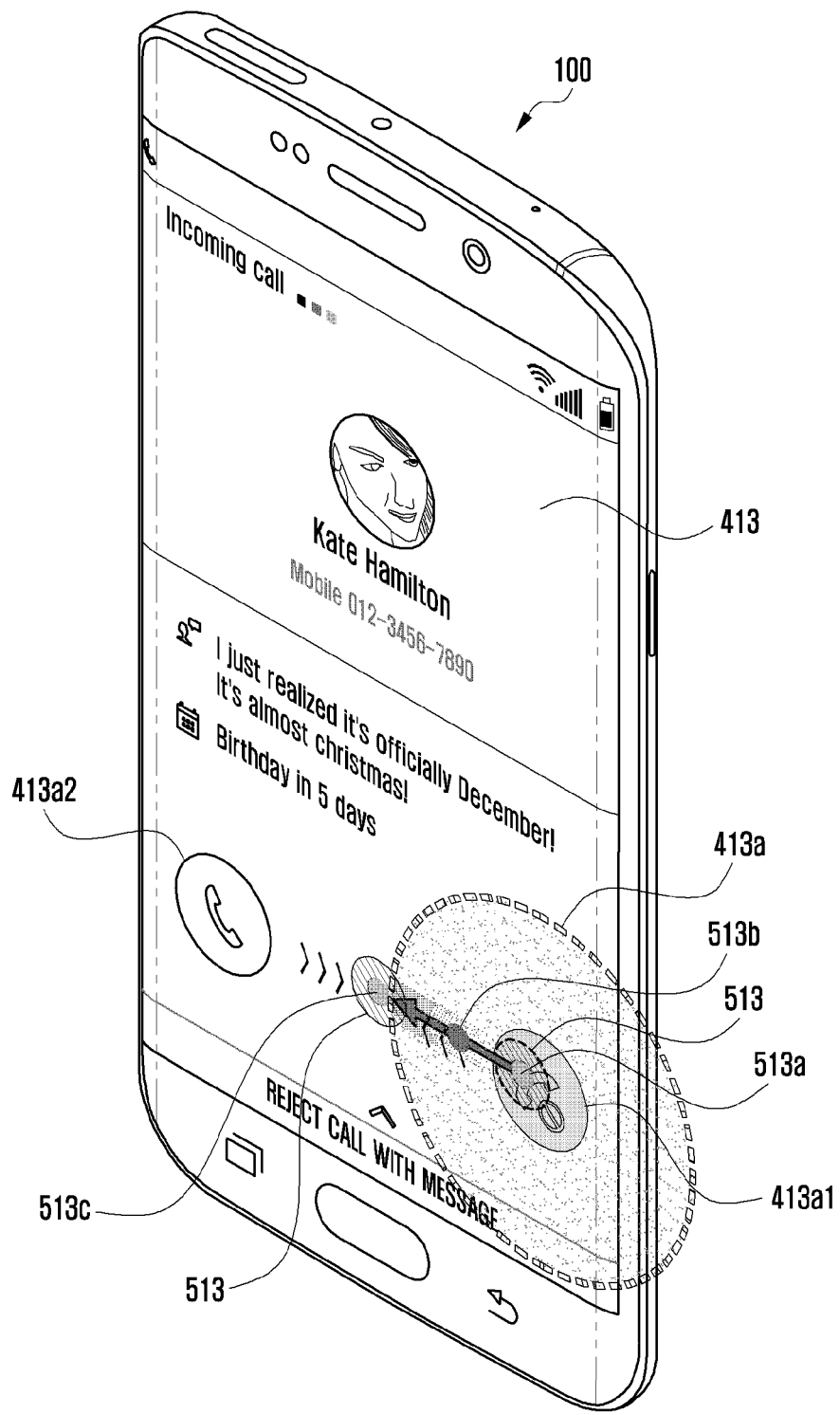
FIG. 4L illustrates a screen of the portable device indicating there is an incoming call.

Referring now to FIG. 4L, according to another embodiment of the present disclosure, the portable device 100 is shown receiving an incoming call. Further, the portable device 100 may output a ring back tone and/or vibration that correspond to the incoming call. The incoming call and the outgoing call may be functions of the call application.

In the case where the portable device 100 receives the incoming call, the user may make a call or reject the call using the touch gesture on the 14$^{th}$ screen 413 of the portable device 100.

In the case where the portable device 100 outputs the reception of the incoming call, the user may input the 13$^{th}$ touch gesture 513 to the 14$^{th}$ screen 413. The control unit 110 may detect (or calculate) the continuous movement (e.g., a plurality of X and Y coordinates that correspond to the continuous touch) of the 13$^{th}$ touch 513 using the edge touch screen 190 and the edge touch screen controller 195. The continuous movement of the 13$^{th}$ touch 513 may be stored in the storage unit 175 under the control of the control unit 110.

In the case where the 13$^{th}$ touch gesture is moved (e.g., from 513a toward 513b), the control unit 110 may determine whether to pass through a call rejection region 413a that corresponds to a call rejection of the 13$^{th}$ touch gesture. The call rejection region 413a may be a region having a radius of 2 cm based on an inner circle (e.g., icon that corresponds to the call rejection) 413a1. The radius of the call rejection region 413a may be shorter than the average length at the stored horizontal gesture setting (e.g., the radius is shorter than the average length for 0.05 to 1 cm). Further, the radius of the call rejection region 413a may be equal to the average length at the stored horizontal gesture setting.

The radius of the call rejection region 413a may be varied to correspond to the user's hand size and/or finger length. In the case where the horizontal gesture setting is stored, the control unit 110 may change the radius of the call rejection region 413a that corresponds to the call rejection.

The control unit 110 may make a call using the movement distance of the 13$^{th}$ touch gesture that is detected in accordance with the gesture setting. Further, the control unit 110 may make the call correspond to the detected movement distance of the 13$^{th}$ touch gesture in accordance with the gesture setting. For example, in the case where the same movement distance of the 13$^{th}$ touch gesture is detected, the control unit 110 may make the call to correspond to the movement distance (e.g., whether to pass through the call rejection region 413a) of the 13$^{th}$ touch gesture in accordance with the gesture setting, or may reject the call.

In the case where the 13$^{th}$ touch gesture passes through the call rejection region 413a, the control unit 110 may release the output ring back tone and/or vibration. The movement of the 13$^{th}$ touch gesture may have the same meaning as the meaning of the continuous movement of the 13$^{th}$ touch.

Not only the passage of the 13$^{th}$ touch gesture through the call rejection region 413a but also the passage of the 13$^{th}$ touch gesture through a call region (not illustrated) may be implemented. The call region (not illustrated) may be a region having a radius of 2 cm based on an inner circle (e.g., icon that corresponds to the call) 413a2. The radius of the call region (not illustrated) may be shorter than the average length at the stored horizontal gesture setting (e.g., the radius is shorter than the average length for 0.05 to 1 cm). Further, the radius of the call region (not illustrated) may be equal to the average length at the stored horizontal gesture setting.

The control unit 110 may provide the user with a feedback that corresponds to the passage of the 13$^{th}$ touch 513 through the call rejection region 413a. The provided feedback may be provided as one of the visual feedback, the auditory feedback, and the tactile feedback. Further, the control unit 110 may provide the user with combinations of the visual feedback, the auditory feedback, and the tactile feedback.

Since the feedback that corresponds to the passage of the 13$^{th}$ touch 513 through the call rejection region 413a is substantially similar (e.g., touch gesture difference) to the feedback that corresponds to the arrival of the 11$^{th}$ touch 511 at the last location 511c, the duplicate explanation thereof will be omitted.

Figure 4M:
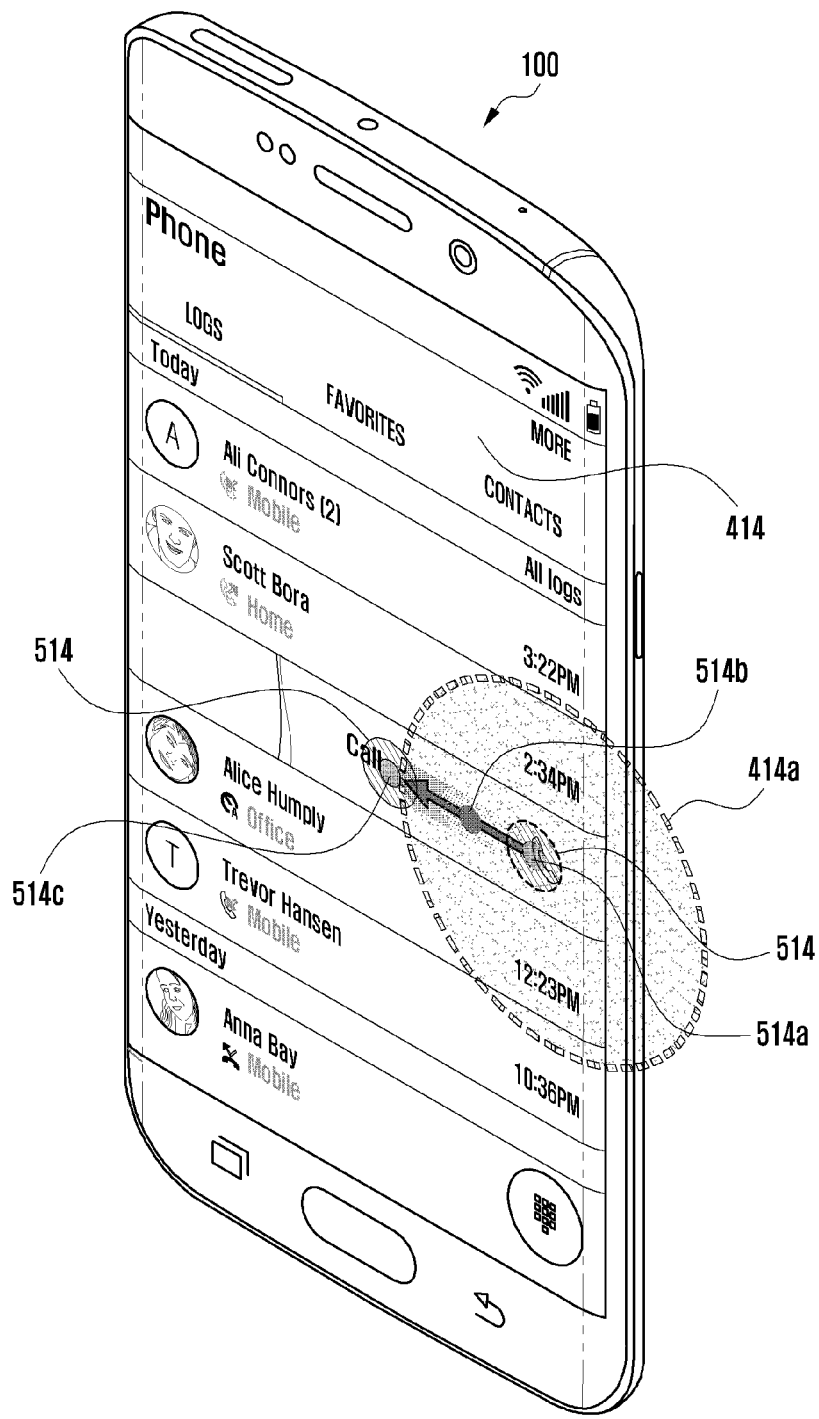
FIG. 4M illustrates a screen of the portable device displaying a list of incoming calls and/or outgoing calls.
Figure 4N:
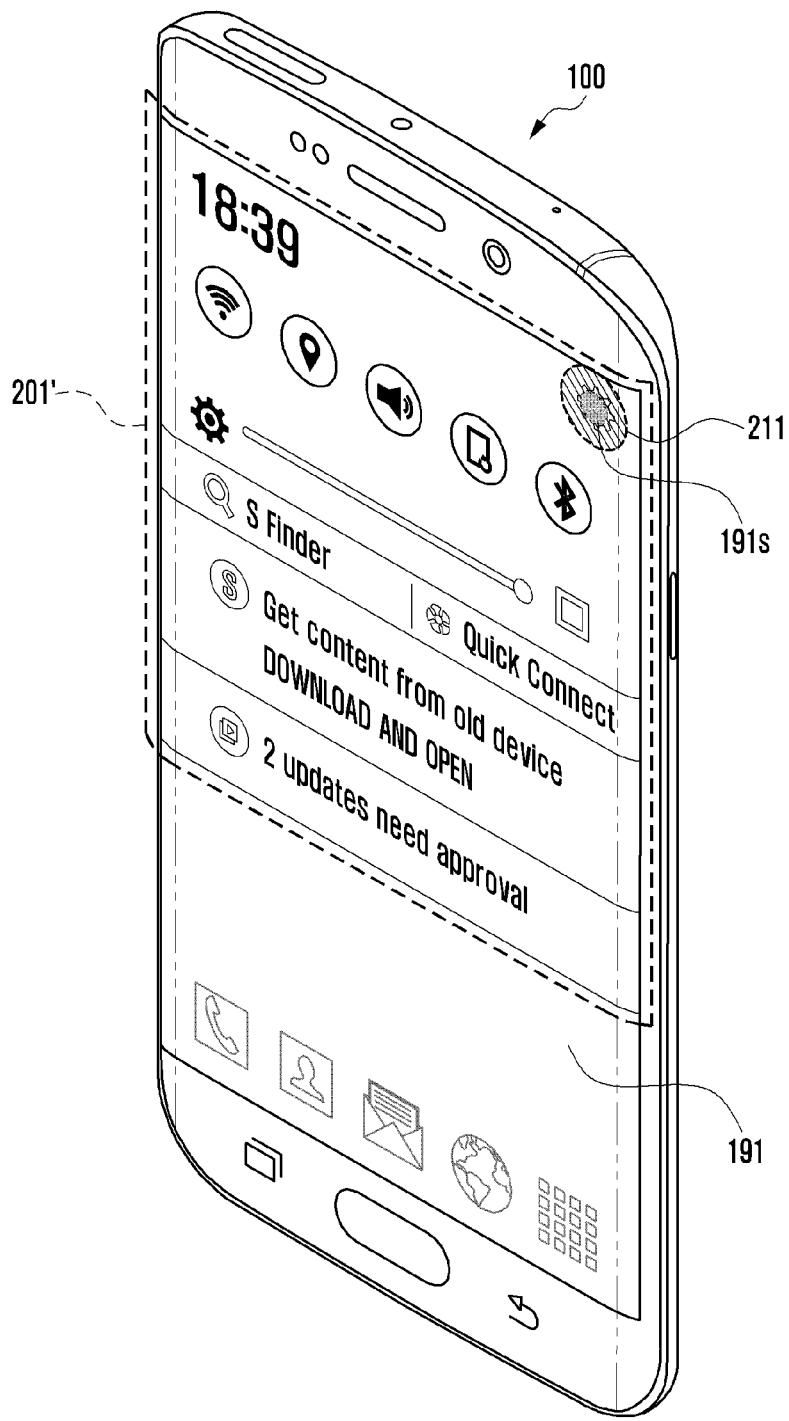
Figure 40:
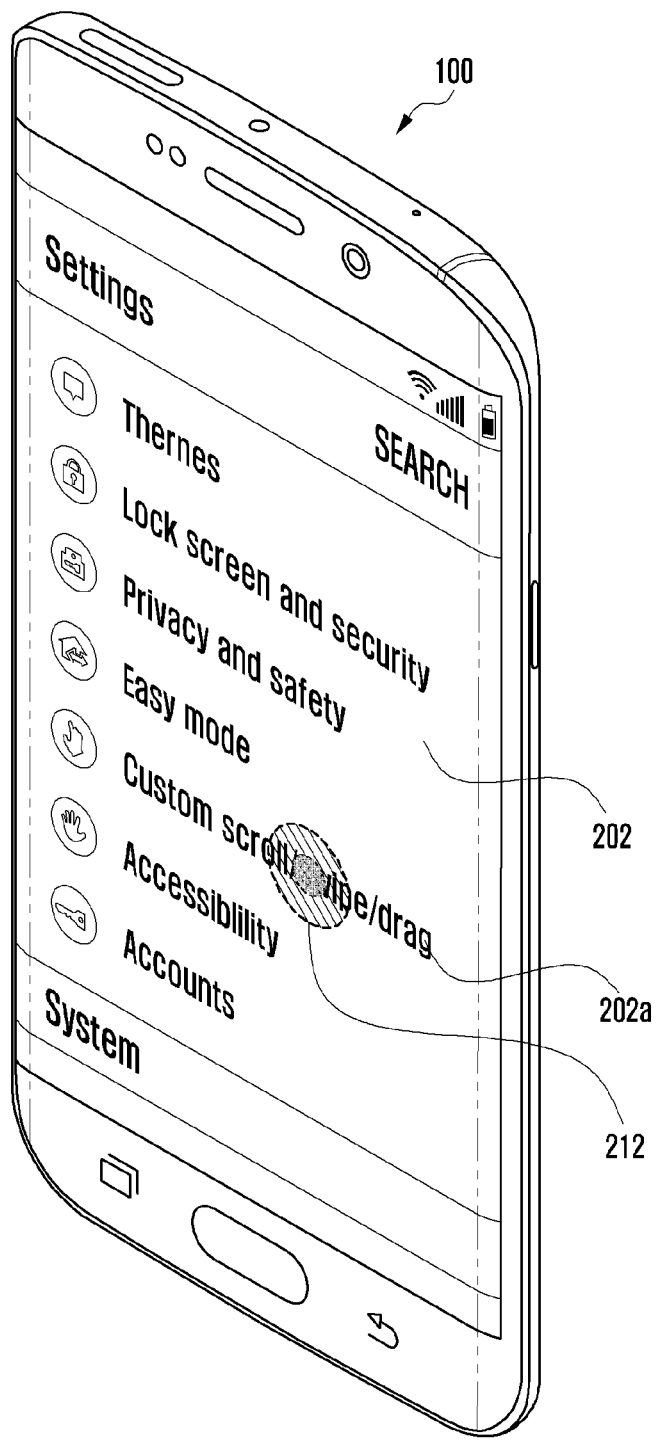

Referring now to FIG. 4M, according to another embodiment of the present disclosure, a list of incoming calls and/or outgoing calls is displayed on the portable device 100.

In the case where the portable device 100 displays the list, the user may select one of a call and a message (e.g., SMS or MMS) using the touch gesture on the 15$^{th}$ screen 414 of the portable device 100.

In the case where the portable device 100 displays the list, the user may input the 14$^{th}$ touch gesture 514 to the 15$^{th}$ screen 414. The control unit 110 may detect (or calculate) the continuous movement (e.g., a plurality of X and Y coordinates that correspond to the continuous touch) of the 14$^{th}$ touch 514 using the edge touch screen 190 and the edge touch screen controller 195. The continuous movement of the 14$^{th}$ touch 514 may be stored in the storage unit 175 under the control of the control unit 110.

In the case where the 14$^{th}$ touch gesture is moved (e.g., from 514a toward 514b), the control unit 110 may determine whether to pass through a call region 414a that corresponds to a call of the 14$^{th}$ touch gesture (e.g., for an opposite party Scott Bora). The call region 414a may be a region having a radius of 2 cm based on the initial location 514a. The radius of the call region 414a may be shorter than the average length at the stored horizontal gesture setting (e.g., the radius is shorter than the average length for 0.05 to 1 cm). Further, the radius of the call region 414a may be equal to the average length at the stored horizontal gesture setting.

The radius of the call region 414a may be varied to correspond to the user's hand size and/or finger length. In the case where the horizontal gesture setting is stored, the control unit 110 may change the radius of the call region 414a that corresponds to the call.

In the case where the 14$^{th}$ touch gesture passes through the call region 414a, the control unit 110 may make an outgoing call to the opposite party Scott Bora. The movement of the 14$^{th}$ touch gesture may have the same meaning as the meaning of the continuous movement of the 14$^{th}$ touch.

Not only the passage of the 14$^{th}$ touch gesture through the call region 414a but also the passage of the 14$^{th}$ touch gesture through a message transmission region (not illustrated) may be implemented. The message transmission region (not illustrated) may be a region having a radius of 2 cm based on an inner circle (e.g., icon that corresponds to the message transmission (not illustrated). The radius of the message transmission region (not illustrated) may be shorter than the average length at the stored horizontal gesture setting (e.g., the radius is shorter than the average length for 0.05 to 1 cm). Further, the radius of the message transmission region (not illustrated) may be equal to the average length at the stored horizontal gesture setting.

The control unit 110 may perform one of the call and the message (e.g., SMS or MMS) using the movement distance of the 14$^{th}$ touch gesture that is detected in accordance with the gesture setting. Further, the control unit 110 may make the call correspond to the detected movement distance of the 14$^{th}$ touch gesture in accordance with the gesture setting. For example, in the case where the same movement distance of the 14$^{th}$ touch gesture is detected, the control unit 110 may make a call or transmit a message to correspond to the movement distance of the 14$^{th}$ touch gesture (e.g., whether to pass through the call region 414a or the gesture transmission region (not illustrated) in accordance with the gesture setting.

The control unit 110 may provide the user with a feedback that corresponds to the passage of the 14$^{th}$ touch 514 through the call region 414a. The provided feedback may be provided as one of the visual feedback, the auditory feedback, and the tactile feedback. Further, the control unit 110 may provide the user with combinations of the visual feedback, the auditory feedback, and the tactile feedback.

Since the feedback that corresponds to the passage of the 14$^{th}$ touch 514 through the call rejection region 414a is substantially similar (e.g., touch gesture difference) to the feedback that corresponds to the arrival of the 11$^{th}$ touch 511 at the last location 511c, the duplicate explanation thereof will be omitted.

At operation S305 of FIG. 3A, in the case where the screen is moved to correspond to the gesture setting, the method for controlling the screen of the portable device is ended.

Figure 3B:
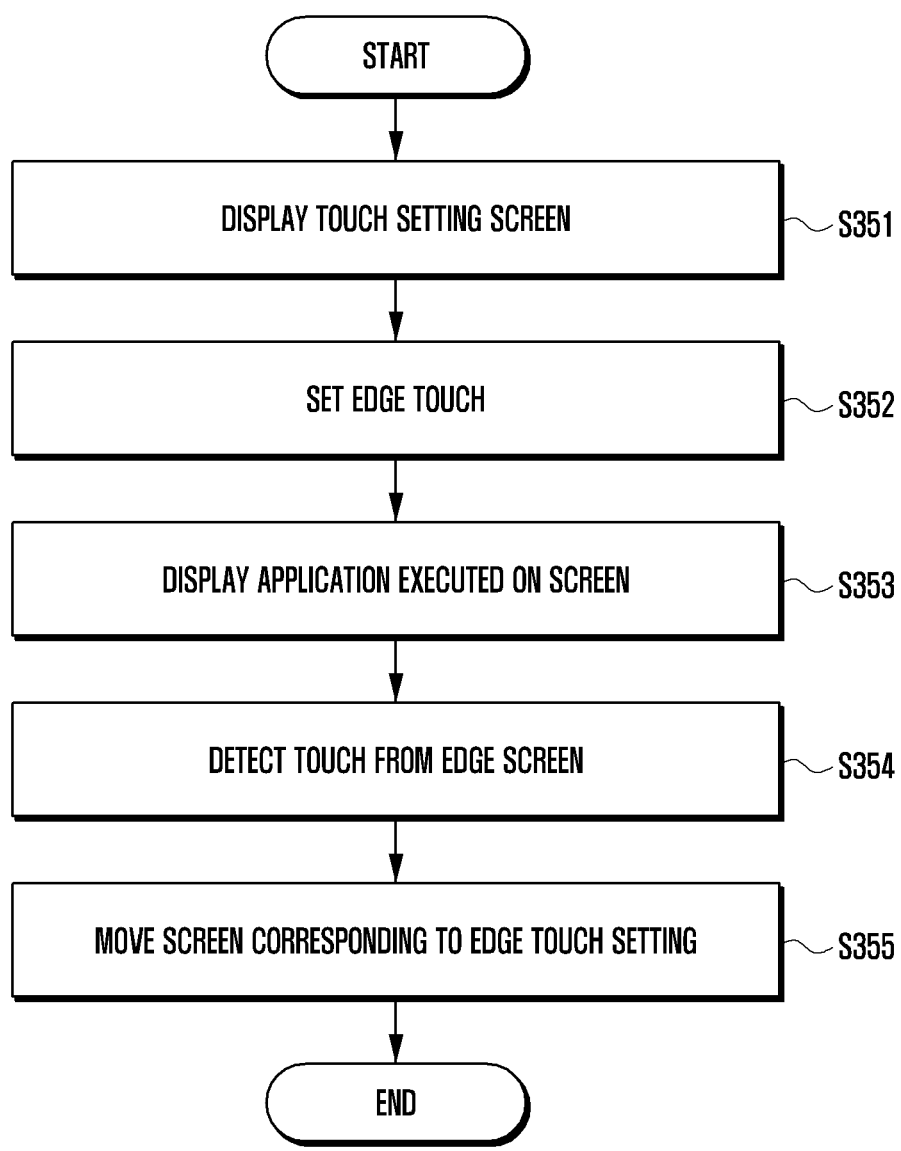
FIG. 3B is a flowchart illustrating a method for controlling a screen of a portable device according to another embodiment of the present disclosure.

FIG. 3B is a schematic flowchart illustrating a method for controlling a screen of a portable device according to another embodiment of the present disclosure.

FIGS. 5A to 5F are views illustrating screen examples of a portable device according to another embodiment of the present disclosure provided in conjunction with the operations in FIG. 3B.

At operation S351 of FIG. 3B, a gesture setting screen is displayed. In more detail, referring to FIG. 5A, an edge touch setting screen 450 is displayed on the edge touch screen 190. The edge touch setting screen 450 may be called a second screen.

The second screen 450 may be displayed on the portable device 100 that is initially booted under the control of the control unit 110. If the gesture setting is completed on the first screen 400, the control unit 110 may display a second screen 450 that follows the first screen 400. Further, in a manner similar to FIGS. 4N to 4O, the second screen 450 may be displayed to follow the first screen 400 that is displayed by user's touches 211 and 212.

The edge touch setting may include a user customized edge touch setting in consideration of various hand sizes and/or various finger lengths of users. The edge touch gesture may include drag, flick, swipe, pinch, or spread. The edge touch gesture may include a single-touch gesture that is detected from the first edge touch screen (e.g., one of 190b and 190c) and multi-touch gesture that is detected from the first and second edge touch screens (e.g., at least one of 190b and 190c).

The edge touch setting may include screen scroll, screen scale-up, or screen scale-down through the drag, flick, swipe, pinch, or spread. Further, the edge touch setting may include application execution (e.g., call, messenger execution, or execution of another application) or application end (e.g., alarm end or call rejection) through the drag, flick, swipe, pinch, or spread.

At operation S351 of FIG. 3B, since the display of the edge touch setting screen 450 is substantially similar to the display of the gesture setting screen 400 at operation S301 of FIG. 3A, the duplicate explanation thereof will be omitted.

At operation S352 of FIG. 3B, the edge touch gesture is set. In more detail, referring to FIGS. 5A and 5B, on the edge touch setting screen 450 of the portable device 100, the edge touch gesture is set by the user.

Figure 5A:
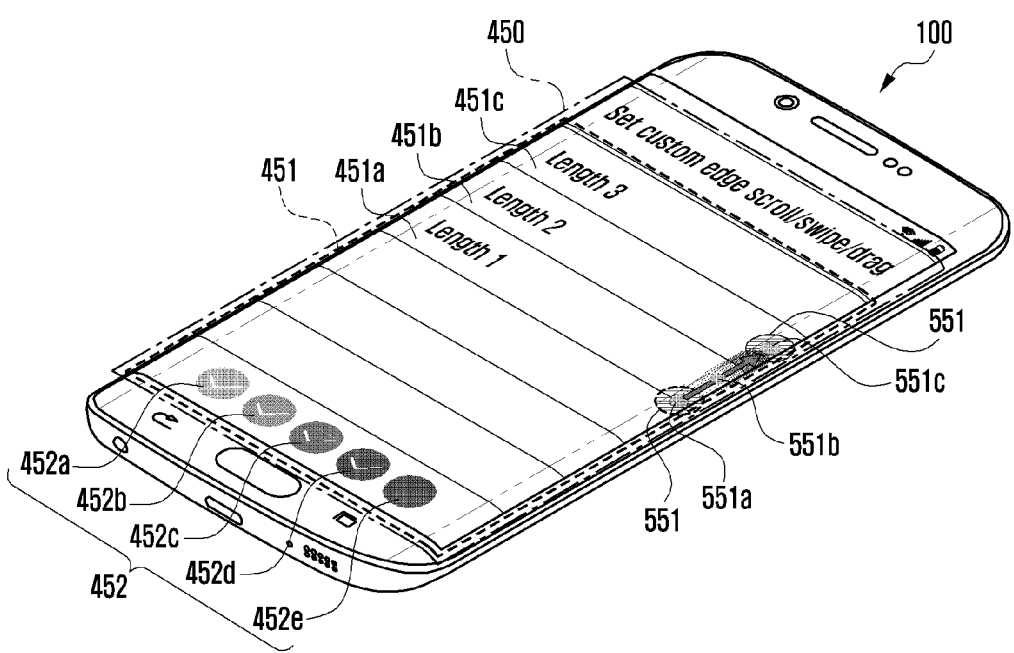
FIG. 5A illustrates an edge touch setting screen displayed by the portable terminal.
Figure 5B:
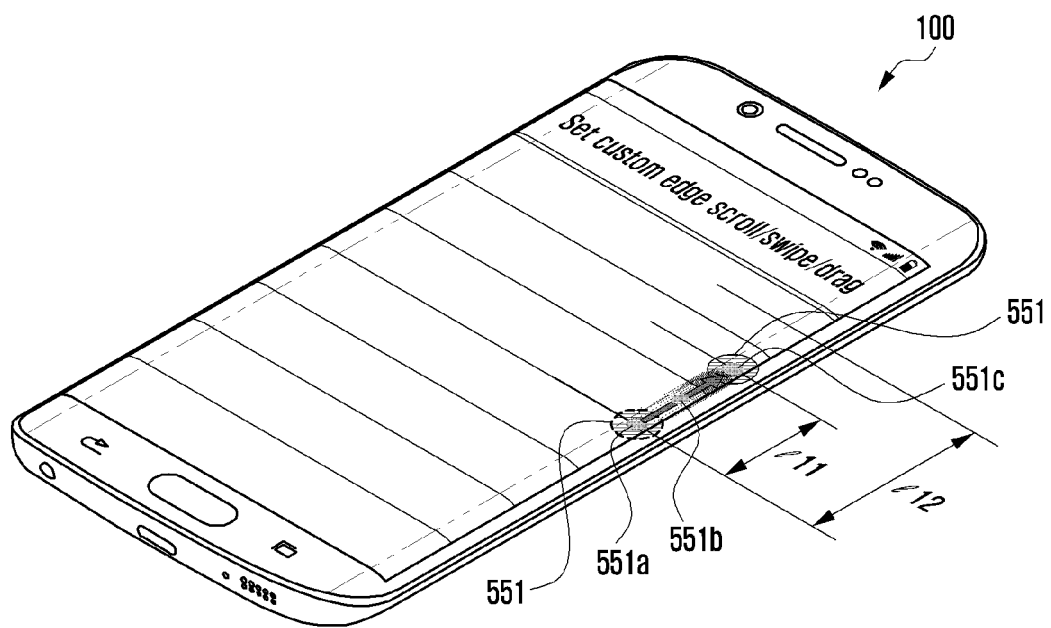
FIG. 5B illustrates customization of an edge touch setting screen displayed by the portable terminal.

Referring now to FIGS. 5A and 5B, an edge touch gesture length detection region 451 for detecting the user's edge touch gesture length may be included in the edge touch setting screen 450. The edge touch gesture length detection region 451 may be divided into a plurality of detection regions, for example, 451a to 451g. The number of the plural detection regions as described above is exemplary, and it will be understood by those of ordinary skill in the art to which the present disclosure pertains that the number of the detection regions may be changed (e.g., the number of the detection regions may be 1, 2, 3, 4, 5, or more) in accordance with the size or resolution of the edge touch screen 190 of the portable device 100.

A counter 452 that indicates the number of times of touch gesture input may be included in the edge touch setting screen 450. Referring to FIG. 5A, the number of times of input touch gestures is 4 (e.g., in the case where the counter 452 has a checkmark). The number of times of edge touch gestures that can be input may be 5 (the number of times can be changed through the setting).

The user may make an edge touch gesture (e.g., continuous movement of a touch from an initial touch 551a to the last touch 551c) on the edge touch gesture length detection region 451. The location of the last touch 551c may be on the edge touch screen 190b or the main touch screen 190a.

The control unit 110 may detect (or calculate) the continuous movement (e.g., a plurality of X and Y coordinates corresponding to a continuous touch) of the $21^{st}$ touch 551 using the edge touch screen 190 and the edge touch screen controller 195. The continuous movement of the $21^{st}$ touch 551 may be stored in the storage unit 175 under the control of the control unit 110.

The continuous movement (e.g., movement from the initial location 551a to the last location 551c such as shown in FIG. 5B) of the $21^{st}$ touch 551 indicates that the $21^{st}$ touch gesture that is detected through the first edge touch screen 190c. The continuous movement of the $21^{st}$ touch 551 may mean the $21^{st}$ touch gesture that is detected from the first edge touch screen 190c to the main touch screen 190a.

The continuous movement such as shown in FIG. 5B (e.g., movement from the initial location 551a to the last location 551c) of the $21^{st}$ touch 551 indicates that the contact of the $21^{st}$ touch 551 is continuously maintained on the first edge touch screen 190c. The continuous movement (e.g., movement from the initial location 551a to the last location 551c) of the $21^{st}$ touch 551 may mean that the contact of the $21^{st}$ touch 551 is continuously maintained from the first edge touch screen 190c to the main touch screen 190a.

As for the continuous movement of the $21^{st}$ touch 551, the touch with the first edge touch screen 190c may be released at the last location 551c.

Although it is described that the trajectory of the $21^{st}$ touch gesture as described above is in the form of a straight line, the trajectory of the touch gesture may be in the form of a straight line having a slope or in the form of a curve having a curvature.

In another embodiment of the present disclosure, a plurality of touches may be included in the "continuous movement of the touch". The two touch locations 551a and 551c as described above are exemplary, and are not limited thereto. It will be understood by those of ordinary skill in the art to which the present disclosure pertains that the number of touches included in the continuous movement of the touch may be changed.

Referring now to FIG. 5A, the continuous movement of the $21^{st}$ touch 551 in the edge touch gesture length detection region 451 may include drag, drag & drop, flick, or swipe. Further, as for the edge touch gesture, the continuous movement of the $21^{st}$ touch 551 in the edge touch gesture length detection region 451 may include a single-touch gesture and a multi-touch gesture.

In the case where the user makes the touch gesture 5 times in the edge touch gesture length detection region 451, the control unit 110 may calculate an average of the lengths of the respectively input touch gestures (e.g., 111). The control unit 110 may calculate a ratio of the calculated average length of the edge touch gesture to the maximum length (e.g., 112) of the edge touch gestures that can be detected in the edge touch gesture length detection region 451 using the calculated average length of the edge touch gestures. For example, if the ratio of the calculated average length of the edge touch gesture to the maximum length of the edge touch gesture is 0.65, the control unit 110 may multiply the ratio (0.65) between the average length and the maximum length by a weight value (e.g., 1.54).

In the case of the user having the ratio (0.65) between the calculated average length and the maximum length, the control unit 110 may multiply the length of the input edge touch gesture by the weight value (e.g., 1.54).

Through the weight value, the control unit 110 may control the presentation of screen to move the display items, like the touch gesture (not illustrated) that is input with the maximum length, in place of the input edge touch gesture length. Through the weight value, the control unit 110 may control changing display of the screen to display of another screen, like the touch gesture (not illustrated) that is input with the maximum length, in place of the input edge touch gesture length.

The ratio between the calculated average length and the maximum length and the weight value may be stored in the storage unit 175 as vertical edge touch setting information under the control of the control unit 110. The stored vertical edge touch setting information may include a touch gesture Identifier (ID) for history management, the number of times of edge touch gestures, each edge touch gesture length, the maximum edge touch gesture length, an average edge touch gesture length, a weight value, or each edge touch gesture input time.

In the case where the length of the continuous movement of the $21^{st}$ touch 551 is equal to the length of the continuous movement of the first touch 501, the movement distance of the screen may be different due to the difference in gesture setting (or difference in edge touch setting). In the case where the length of the continuous movement of the $21^{st}$ touch 551 is equal to the length of the continuous movement of the first touch 501, the movement distance of the screen may be different due to the difference between the maximum lengths 12 and 112 of the continuous movement of the touch. Further, in the case where the length of the continuous movement of the $21^{st}$ touch 551 is equal to the length of the continuous movement of the first touch 501, the movement distance of the screen may be different due to the difference in weight value that corresponds to the average touch length.

Referring now to FIG. 4F, setting of various items of the portable device 100 that is initially booted may be completed 201. As shown in FIGS. 5A and 5B, the setting of the touch gesture in the vertical direction may be completed by the user.

At operation S353 of FIG. 3B, an executed application is displayed on the screen. In more detail, referring to FIG. 5C, the user touches (not illustrated) one (e.g., photo gallery) of shortcut icons 191a (see FIG. 1A) displayed on the screen of the portable device 100.

The control unit 110 may execute an application (e.g., photo gallery) that corresponds to the touch. The control unit 110 may display the $21^{st}$ screen 460 of the executed application. The $21^{st}$ screen 460 may include a plurality of photos 460a.

Figure 5C:
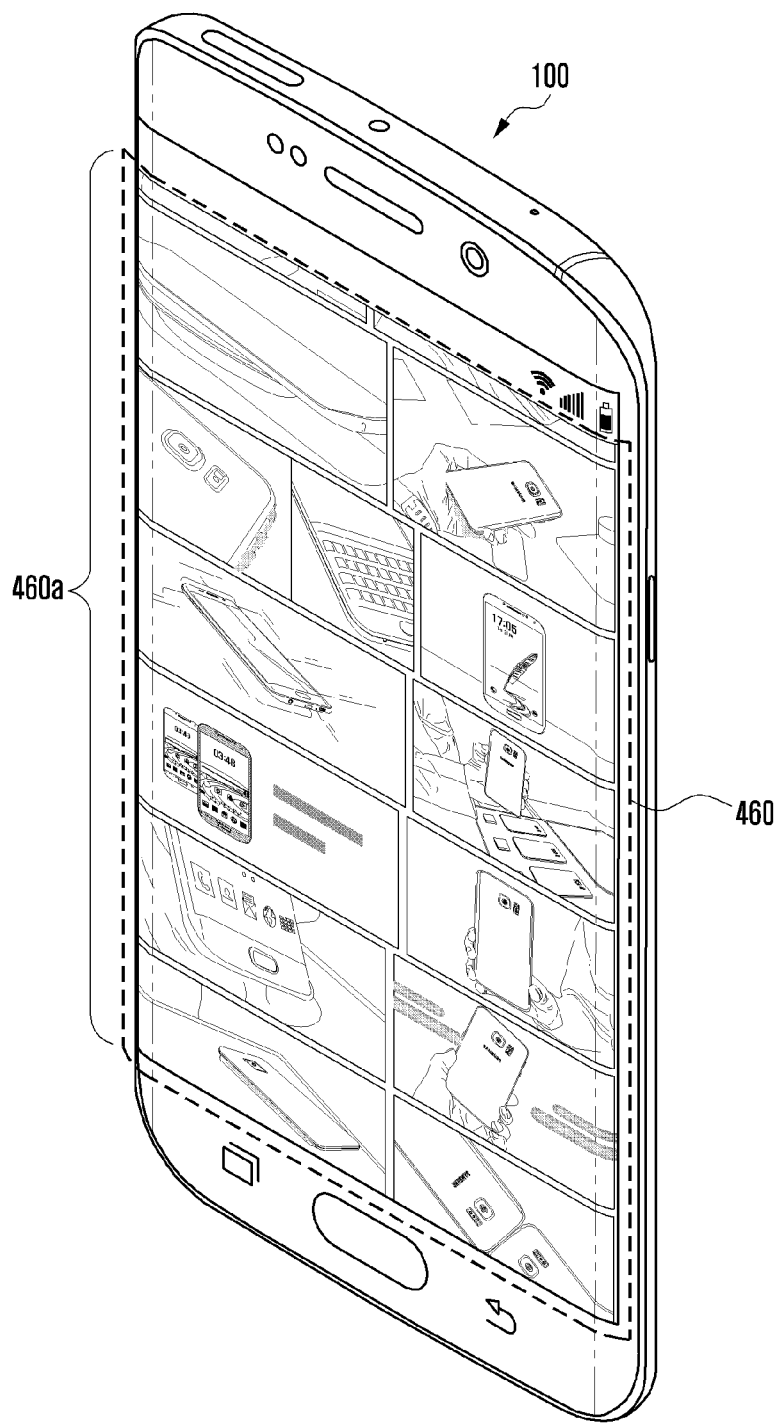
FIG. 5C illustrates a display of shortcut icons.
Figure 5D:
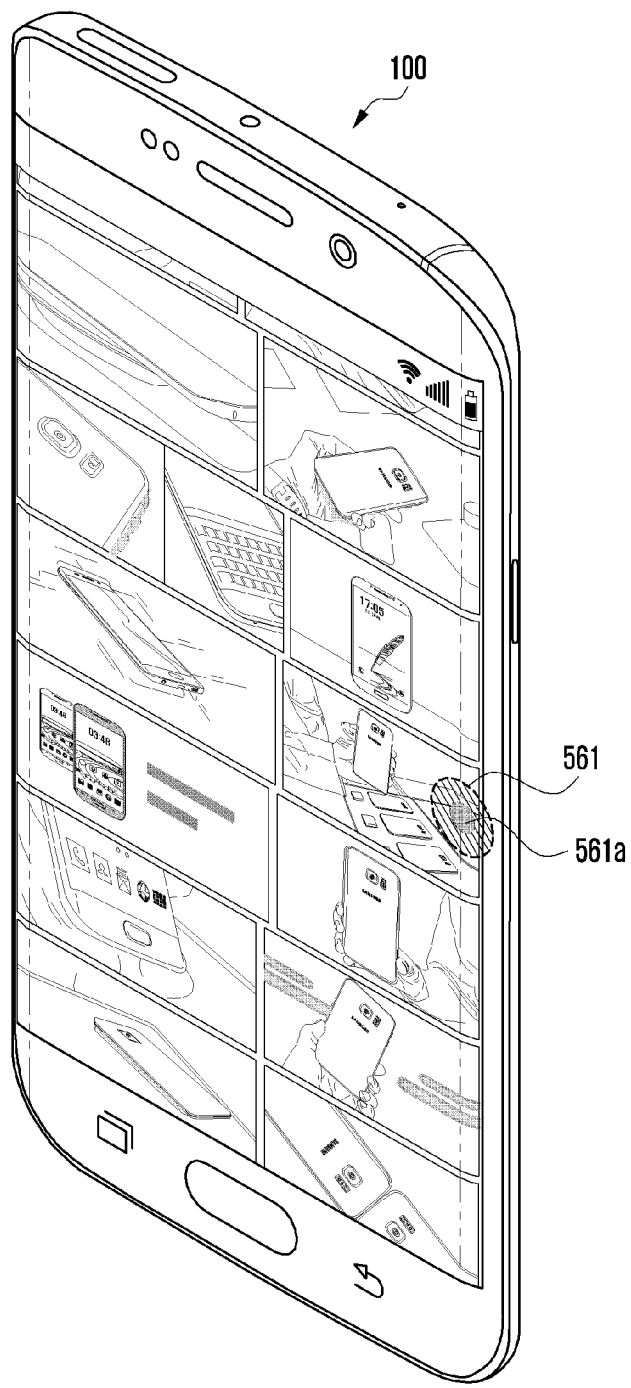
FIG. 5D illustrates a touch gesture being performed on the one of the shortcut icons displayed in FIG. 5C.

Since the displayed application screen in FIG. 5C is substantially similar to the displayed application screen in FIG. 4G, the duplicate explanation thereof will be omitted.

At operation S354 of FIG. 3B, the touch gesture is detected. In more detail, referring to FIGS. 5D to 5F, the user inputs the $31^{st}$ touch gesture (e.g., from the initial location 561a to the last location 561c) on the $21^{st}$ screen 460.

The control unit 110 may detect (or calculate) the continuous movement (e.g., a plurality of X and Y coordinates corresponding to the continuous touch) of the $31^{st}$ touch 561 using the edge touch screen 190 and the edge touch screen controller 195. The value of the continuous movement of the $31^{st}$ touch 561 may be stored in the storage unit 175 under the control of the control unit 110.

At operation S355 of FIG. 3B, the screen is moved to correspond to the edge touch setting. In more detail, referring to FIGS. 5E and 5F, the control unit 110 controls presentation of the screen to move display of the $21^{st}$ screen 460 corresponding to the $31^{st}$ touch gesture.

Figure 5E:
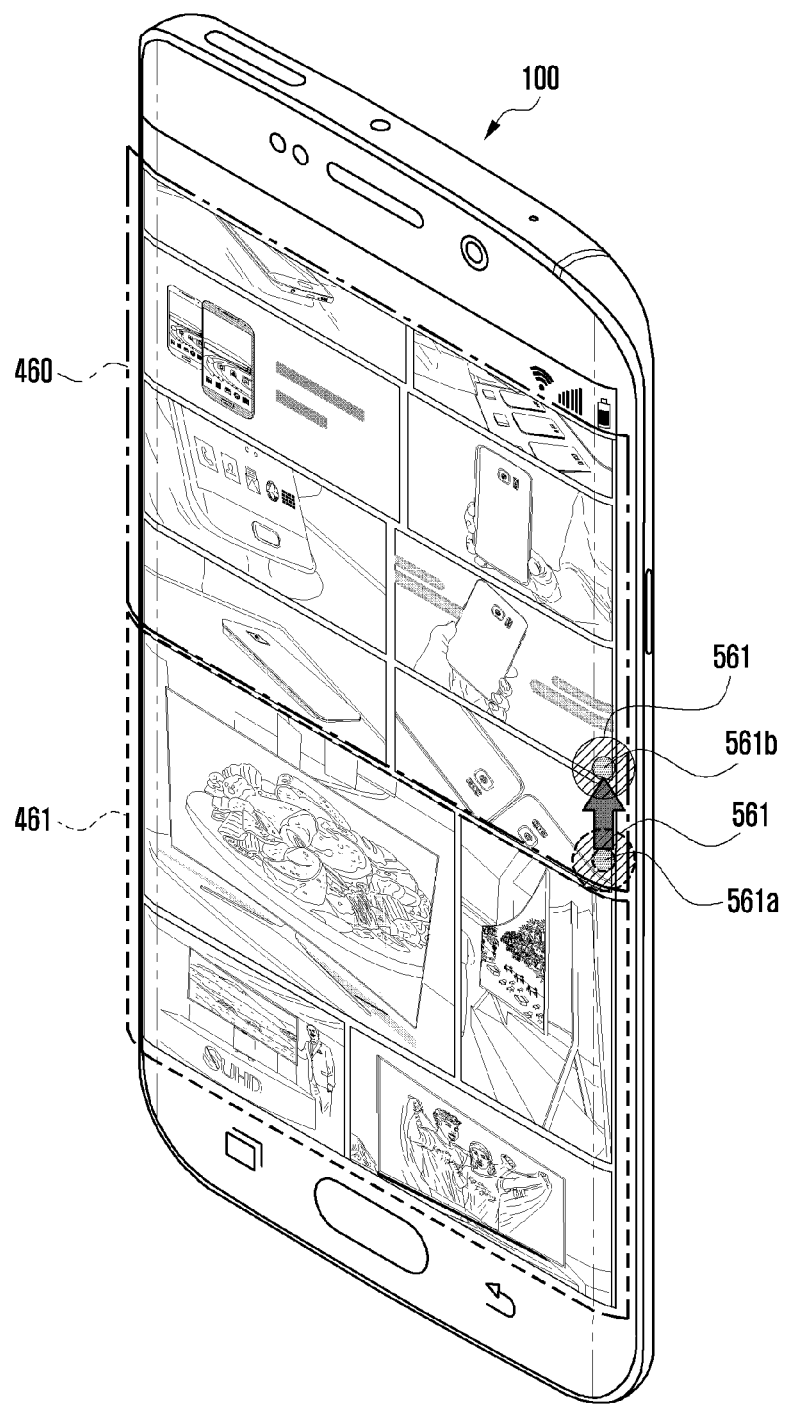
FIG. 5E and FIG. 5F indicate the movement of the display of certain items displayed in response to a touch gesture according to another embodiment of the present disclosure.
Figure 5F:
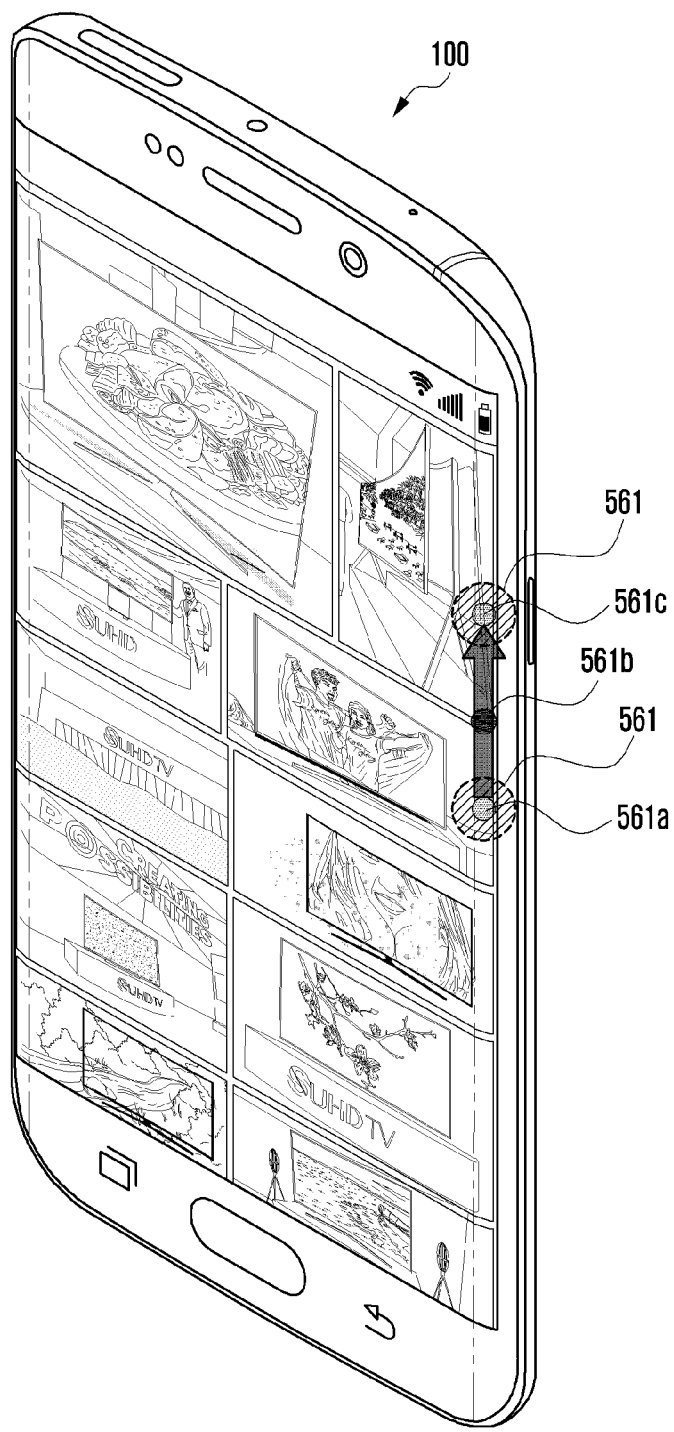

In the case where the $31^{st}$ touch gesture is moved (e.g., from 561a to 561b), the control unit 110 may move display of the $21^{st}$ screen 460 upward in accordance with the movement direction of the $31^{st}$ touch gesture. In the case where the $31^{st}$ touch gesture is moved (e.g., from 561a to 561b such as shown in FIG. 5E), the control unit 110 may move the $21^{st}$ screen 460 upward (such as shown in FIG. 5F) using the stored vertical edge touch setting. In the case where the $31^{st}$ touch gesture is moved (e.g., ⅖ of an average length in the stored edge touch setting), the control unit 110 may move the $21^{st}$ screen 460 for about ⅖ upward using the stored vertical edge touch setting.

In the case where the $31^{st}$ touch gesture is moved (e.g., from 561a to 561b, for about a half (½) of the average length in the stored edge touch setting), the control unit 110 may move display of the $21^{st}$ screen 460 for about ½ upward using the stored vertical edge touch setting.

The control unit 110 may not display a photo that is located at an upper end of the $21^{st}$ screen 460 corresponding to an upward movement of the $21^{st}$ screen 460. The control unit 110 may move display of the $22^{nd}$ screen 461 that follows the $21^{st}$ screen 460 upward corresponding to the upward movement of the $21^{st}$ screen 460. The control unit 110 may move the $22^{nd}$ screen 461 that follows the $21^{st}$ screen 460 upward together corresponding to the upward movement of the $21^{st}$ screen 460.

Until the touch of the $31^{st}$ touch gesture is released in the portable device 100, the control unit 110 may move display of the $22^{nd}$ screen 461 that follows the $21^{st}$ screen 460 upward together.

The control unit 110 may operate to make the movement distance of the $31^{st}$ touch gesture that is detected in accordance with the gesture setting different from the movement distance of the $21^{st}$ screen 460. Further, the control unit 110 may operate to make the movement distance of the $21^{st}$ screen 460 differ from the detected movement distance of the $31^{st}$ touch gesture in accordance with the gesture setting. For example, if the same movement distance of the $31^{st}$ touch gesture is detected, the control unit 110 may operate to make the movement distance of the $21^{st}$ screen 460 differ from the detected movement distance of the $31^{st}$ touch gesture in accordance with the gesture setting.

Referring now to FIG. 5F, in the case where the $31^{st}$ touch gesture is moved (e.g., from the initial location 561a to the last location 561c) for the average movement distance, the control unit 110 may display the $22^{nd}$ screen 461. In the case where the $31^{st}$ touch gesture is moved (e.g., from the initial location 561a to the last location 561c) for the average movement distance, the control unit 110 may display the $22^{nd}$ screen 461.

In the case where the $31^{st}$ touch gesture is moved (e.g., the contact of the $31^{st}$ touch gesture is released) for the average length, the control unit 110 may display the $22^{nd}$ screen 461 to be larger than the $21^{st}$ screen 460 (e.g., so that the area of the $22^{nd}$ screen being displayed becomes larger than the area of the $21^{st}$ screen).

The movement of the $31^{st}$ touch gesture may have the same meaning as the meaning of the continuous movement of the $31^{st}$ touch.

The control unit 110 may provide the user with a feedback that corresponds to arrival of the $31^{st}$ touch 561 at the last location 561c. The feedback may be provided as one of visual feedback, auditory feedback, and tactile feedback. Further, the control unit 110 may provide the user with a combination of the visual feedback, the auditory feedback, and the tactile feedback.

At operation S355 of FIG. 3B, the feedback that corresponds to the arrival of the $31^{st}$ touch 561 at the last location 561c is substantially similar (e.g., touch gesture difference) to the feedback that corresponds to the arrival of the $11^{th}$ touch 511 at the last location 511c, and thus the duplicate explanation thereof will be omitted.

At operation S355 of FIG. 3B, in the case where the screen is moved to correspond to the edge touch setting, the method for controlling the screen of the portable device is ended.

While the present disclosure has been shown and described with reference to various embodiments thereof, it will be understood by those skilled in the art that various changes in form and details may be made therein without departing from the spirit and scope of the present disclosure as defined by the appended claims and their equivalents.

The above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. Any of the functions and steps provided in the Figures may be implemented in hardware, or a combination hardware configured with machine executable code and may be performed in whole or in part within the programmed instructions of a computer. No claim element herein is to be construed under the provisions of 35 U.S.C. 112, sixth paragraph, unless the element is expressly recited using the phrase "means for." In addition, under the broadest reasonable interpretation, the appended claims are statutory subject matter in compliance with 35 U.S.C. § 101.

The methods according to exemplary embodiments of the present disclosure may be implemented in the form of program commands that can be performed through various computer means and may be recorded in a computer readable medium. The computer readable medium may include program commands, data files, and data structures singly or in combination. For example, the computer readable medium may include, regardless of whether it is erasable or rewritable, a volatile memory or a nonvolatile memory, such as a storage device such as a ROM, a memory, such as a RAM, a memory chip, a device, or an integrated circuit, or a storage medium which is optically or magnetically recordable, such as a CD, a DVD, magnetic disk, or magnetic type, and is readable by a machine (e.g., computer).

A memory can be included in a portable device is an example of a storage medium which can be read by a program including instructions that implement the embodiments of the present disclosure or a machine that is suitable to store programs. The program commands that are recorded in the medium may be specially designed and configured or may be known to computer software providers to be used.

It will be understood that the above-described embodiments are exemplary to help easy understanding of the contents of the present disclosure and do not limit the scope of the present disclosure. Accordingly, the scope of the present disclosure is defined by the appended claims, and it will be construed that all corrections and modifications derived from the meanings and scope of the following claims and the equivalent concept fall within the scope of the present disclosure.

What is claimed is:

1. A portable device comprising:
a touch screen configured to display a first screen, wherein the touch screen includes a main touch screen and an edge touch screen located on at least one side of the main touch screen; and
a control unit configured to control the touch screen, wherein the control unit:
controls presentation of the display of the first screen to move in correspondence to a direction of a continuous movement of a first touch that is detected on the first screen,
controls a movement distance of the displayed first screen to be different than a movement distance of the detected first touch in accordance with a stored first gesture setting,
detects the continuous movement of the first touch from the edge touch screen, and
controls presentation of the display of the first screen to move in correspondence to the direction of the continuous movement of the first touch that is detected from the edge touch screen in accordance with a stored second gesture setting.

2. The portable device of claim 1, wherein the first gesture setting is set in accordance with a ratio of a user's average touch gesture length to a maximum touch gesture length, and
the control unit controls presentation of the display of the first screen to move in correspondence to the continuous movement of the first touch using the first gesture setting.

3. The portable device of claim 2, wherein the control unit controls presentation of the display of the first screen such that the movement distance of the displayed first screen is larger than the movement distance of the continuous movement of the detected first touch in accordance with the first gesture setting.

4. The portable device of claim 1, wherein the control unit detects the continuous movement of the first touch, starting from an initial location of the first touch and arriving at a last location thereof.

5. The portable device of claim 4, wherein the last location of the first touch is in a vertical direction from the initial location of the first touch.

6. The portable device of claim 4, wherein the last location of the first touch is in a horizontal direction from the initial location of the first touch.

7. The portable device of claim 1, wherein the continuous movement of the first touch includes at least one of a drag, a flick, and a swipe.

8. The portable device of claim 1, wherein the touch screen is formed in a body, and the edge touch screen is located on two sides of the main touch screen.

9. The portable device of claim 1, wherein the second gesture setting is set in accordance with a ratio of a user's average touch gesture length to a maximum touch gesture length on the edge touch screen, and
the control unit controls presentation of the display of the first screen to correspond to the continuous movement of the first touch using the second gesture setting.

10. The portable device of claim 9, wherein the control unit controls presentation of the display of the movement distance of the first screen to be larger than a movement distance of the continuous movement of the detected first touch in accordance with the second gesture setting.

11. The portable device of claim 9, wherein the control unit controls presentation of the display of the movement distance of the first screen to correspond to the first gesture setting, and the continuous movement of the first touch is different than the displayed movement distance of the first screen corresponding to the second gesture setting and the continuous movement of the first touch.

12. A method for controlling a screen of a portable device comprising:
storing in a memory a first gesture setting and a second gesture setting through a touch screen, wherein the touch screen includes a main touch screen and an edge touch screen located on at least one side of the main touch screen;
displaying a first screen on the touch screen;
detecting a first touch gesture on the touch screen;
moving a display of the first screen according to a length of the detected first touch gesture and the first gesture setting, wherein a movement distance of the displayed first screen is different than a movement distance of the detected first touch gesture in accordance with the first gesture setting;

detecting a continuous movement of the first touch gesture from the edge touch screen; and moving the display of the first screen according to a direction of the continuous movement of the first touch gesture that is detected from the edge touch screen in accordance with the second gesture setting.

13. The method of claim 12, wherein the first gesture setting is set in accordance with a ratio of a user's average touch gesture length to a maximum touch gesture length.

14. The method of claim 12, wherein the first gesture setting comprises a horizontal gesture setting and a vertical gesture setting.

15. The method of claim 12, further comprising providing a feedback corresponding to the moving the display of the first screen, and wherein the feedback comprises at least one of a visual feedback, an auditory feedback, and a tactile feedback.

16. A non-transitory computer-readable storage medium storing one or more programs comprising instructions which, when executed by at least one processor of an electronic device, cause the electronic device to:

store in a memory a first gesture setting and a second gesture setting through a touch screen, wherein the touch screen includes a main touch screen and an edge touch screen located on at least one side of the main touch screen;

display a first screen on the touch screen;

detect a first touch gesture on the touch screen;

move display of the first screen according to a length of the detected first touch gesture and the first gesture setting, wherein a movement distance of the displayed first screen is different than a movement distance of the detected first touch gesture in accordance with the first gesture setting;

detect a continuous movement of the first touch gesture from the edge touch screen; and move the display of the first screen according to a direction of the continuous movement of the first touch gesture that is detected from the edge touch screen in accordance with the second gesture setting.

* * * * *